US012634361B2

(12) United States Patent
Shen et al.

(10) Patent No.: US 12,634,361 B2
(45) Date of Patent: May 19, 2026

(54) INFORMATION PROCESSING METHOD, DEVICE, AND STORAGE MEDIUM

(71) Applicant: SHENZHEN TRANSSION HOLDINGS CO., LTD., Shenzhen (CN)

(72) Inventors: Jianfeng Shen, Shenzhen (CN); Zhiyong Wang, Shenzhen (CN); Chenxiong Li, Shenzhen (CN)

(73) Assignee: SHENZHEN TRANSSION HOLDINGS CO., LTD., Shenzhen (CN)

( * ) Notice: Subject to any disclaimer, the term of this patent is extended or adjusted under 35 U.S.C. 154(b) by 0 days.

(21) Appl. No.: 18/525,206

(22) Filed: Nov. 30, 2023

(65) Prior Publication Data

US 2024/0098137 A1     Mar. 21, 2024

Related U.S. Application Data

(63) Continuation of application No. PCT/CN2022/091992, filed on May 10, 2022.

(30) Foreign Application Priority Data

Jun. 1, 2021    (CN) .......................... 202110607400.9

(51) Int. Cl.
*G06F 15/16*      (2006.01)
*H04L 67/06*      (2022.01)

(52) U.S. Cl.
CPC .................................... *H04L 67/06* (2013.01)

(58) Field of Classification Search
CPC ..... H04L 67/06; H04L 67/10; H04L 67/1097; H04W 4/80; H04W 4/00; H04W 8/005; G06Q 20/3224
See application file for complete search history.

(56) References Cited

U.S. PATENT DOCUMENTS

2008/0181578 A1*   7/2008   Hanes .............. H04N 21/43615
                                                     386/232
2009/0307228 A1    12/2009  Park et al.
                      (Continued)

FOREIGN PATENT DOCUMENTS

CN          103379107 A     10/2013
CN          103516565 A     1/2014
                   (Continued)

OTHER PUBLICATIONS

Shen, "Information sharing method", Jun. 2020, CN111327764A (Year: 2020).*

(Continued)

*Primary Examiner* — Nicholas R Taylor
*Assistant Examiner* — Ho T Shiu
(74) *Attorney, Agent, or Firm* — Westbridge IP LLC

(57)          ABSTRACT

Disclosed are an information processing method and an information processing device. The information processing method is applied to a sending terminal, including following steps: in response to that sharing information is sent to at least one first receiving terminal and at least one second receiving terminal; and in response to that the first receiving terminal does not meet a first preset condition, processing the sharing information according to at least one first preset strategy; and/or in response to that the second receiving terminal does not meet a second preset condition, processing the sharing information according to at least one second preset strategy. In the present application, based on the conditional determination and processing strategies of the receiving terminal, information can be shared between different devices conveniently and quickly, thereby improving the user experience.

11 Claims, 6 Drawing Sheets

(56) References Cited

U.S. PATENT DOCUMENTS

| | | | | |
|---|---|---|---|---|
| 2012/0149404 | A1* | 6/2012 | Beattie, Jr. | ............ G06F 16/258 |
| | | | | 455/507 |
| 2015/0249851 | A1* | 9/2015 | Zhang | ................ H04L 65/4038 |
| | | | | 725/100 |
| 2016/0360343 | A1* | 12/2016 | Shi | .......................... H04W 4/00 |
| 2020/0076876 | A1 | 3/2020 | Zhang | |
| 2023/0195310 | A1* | 6/2023 | Fan | ...................... G06F 3/0644 |
| | | | | 711/171 |

FOREIGN PATENT DOCUMENTS

| | | | |
|---|---|---|---|
| CN | 104348875 | A | 2/2015 |
| CN | 108259320 | A | 7/2018 |
| CN | 108768838 | A | 11/2018 |
| CN | 111327516 | A | 6/2020 |
| CN | 111327517 | A | 6/2020 |
| CN | 111327764 | A | 6/2020 |
| CN | 111935849 | A | 11/2020 |
| CN | 112994997 | A | 6/2021 |
| CN | 113259227 | A | 8/2021 |
| WO | 2018076840 | A1 | 5/2018 |

OTHER PUBLICATIONS

Shen, "Information sharing method English Translation", Jun. 2020, CN111327764A (Year: 2020).*

Extended European Search Report issued in counterpart Europe Patent Application No. 22814982.9, dated Jul. 24, 2024.

First Office Action issued in counterpart Chinese Patent Application No. 202110607400.9, dated Aug. 25, 2021.

International Search Report and Written Opinion issued in corresponding PCT Application No. PCT/CN2022/091992, dated Jun. 28, 2022.

Notification to Grant Patent Right for Invention issued in counterpart Chinese Patent Application No. 202110607400.9, dated Jan. 11, 2022.

* cited by examiner

S1000 in response to first sharing information is sent to at least one first receiving terminal and second sharing information is sent to at least one second receiving terminal

S2000 when the first receiving terminal does not meet the first preset condition, processing the first sharing information and/or the second sharing information according to at least one first preset strategy; and/or in response to that the second receiving terminal does not meet the second preset condition, processing the first sharing information and/or the second sharing information according to at least one second preset strategy

INFORMATION PROCESSING METHOD, DEVICE, AND STORAGE MEDIUM

CROSS-REFERENCE TO RELATED APPLICATIONS

This application is a continuation application of International Application No. PCT/CN2022/091992, filed on May 10, 2022, which claims priority to Chinese Patent Application No. 202110607400.9, filed on Jun. 1, 2021, and entitled "INFORMATION PROCESSING METHOD, DEVICE, AND STORAGE MEDIUM". All of the aforementioned applications are incorporated herein by reference in their entireties.

TECHNICAL FIELD

The present application relates to the technical field of communication, and in particular to an information processing method and an information processing device.

BACKGROUND

With the widespread adoption of the Internet of Things, there is an increasing demand for communication and sharing among people and/or devices. During the process of conceiving and implementing the present application, the inventors found that there are at least the following problems: in some implementations, there are inconveniences, lack of efficiency, or lack of intelligence in the operations during the sharing process, which will affect user experience.

For example, the sharing information can only be processed according to the operation of the receiving terminal, or the sharing information can only be processed before sharing, and so on.

SUMMARY

In view of the above technical problems, the present application provides an information processing method and an information processing device, to enable users to share information conveniently and quickly.

In order to solve the above technical problem, the present application provides a first information processing method, applied to a sending terminal, including following steps:

S100, in response to that sharing information is sent to at least one first receiving terminal, detecting whether an associated second receiving terminal exists;

S200, in response to that the associated second receiving terminal exists, detecting whether the first receiving terminal and/or the second receiving terminal meet the preset conditions; and S300, in response to that the preset conditions are met, processing the sharing information according to a preset strategy.

In an embodiment, the step S100 includes at least one of the following:

in response to a preset operation of sending the sharing information to at least one first receiving terminal;

in response to that the sharing information starts to be sent to at least one first receiving terminal; and in response to that sending the sharing information to at least one first receiving terminal is finished.

In an embodiment, the step S100 includes at least one of the following:

detecting whether an associated second receiving terminal exists according to terminal association information of the sending terminal and/or the first receiving terminal;

detecting whether the associated second receiving terminal exists according to the content and/or type of the sharing information; and detecting whether the associated second receiving terminal exists according to the mode and/or scenario of the sending terminal and/or the first receiving terminal.

In an embodiment, the associated second receiving terminal may be any device connected and/or bound to the sending terminal and/or the first receiving terminal. In an embodiment, the connection may be a direct connection or an indirect connection.

In an embodiment, binding may mean that the login account information is the same, or a matching connection, or through user-defined settings, and the like.

In an embodiment, before the step S200 or the step S300, the method also includes:

detecting whether the sending terminal is in a preset mode or a preset scenario, and if so, executing the step S200 or the step S300; and/or if not, not executing the step S200 or the step S300 and/or outputting prompt information.

In an embodiment, the preset condition includes that the first receiving terminal does not meet the first preset condition and/or the second receiving terminal does not meet the second preset condition, and the step S300 includes:

in response to that the first receiving terminal does not meet the first preset condition, processing the sharing information according to at least one first preset strategy; and/or in response to that the second receiving terminal does not meet the second preset condition, processing the sharing information according to at least one second preset strategy.

In an embodiment, the processing the sharing information according to at least one first preset strategy, and/or processing the sharing information according to at least one second preset strategy includes at least one of the following:

pausing sharing with the first receiving terminal and/or the second receiving terminal;

canceling sharing with the first receiving terminal and/or the second receiving terminal;

delaying sharing with the first receiving terminal and/or the second receiving terminal, and/or starting or resuming sharing with the first receiving terminal and/or the second receiving terminal until the first receiving terminal meets the first preset condition and/or the second receiving terminal meets the second preset condition;

outputting prompt information, and/or in response to determining a first sharing operation, starting or resuming sharing with the first receiving terminal and/or the second receiving terminal; and withdrawing information shared to the first receiving terminal and/or the second receiving terminal.

In an embodiment, the processing the sharing information according to at least one second preset strategy further includes the following:

if the sharing information needs to be sent to the first receiving terminal, processing the sharing information through the second receiving terminal.

In an embodiment, the performing at least one of the following processing on the processed sharing information:

delaying sharing with the first receiving terminal, and/or after the first receiving terminal meets the first preset condition, starting or resuming sharing with the first receiving terminal;

outputting prompt information, and/or in response to determining the second sharing operation, starting or resuming sharing with the first receiving terminal.

In an embodiment, the first preset condition includes that the first receiving terminal has preset authority and the second preset condition includes that the second receiving terminal does not have preset authority, the processing the sharing information according to at least one first preset strategy and at least one second preset strategy includes:

when the first receiving terminal does not meet the first preset condition and the second receiving terminal does not meet the second preset condition, the sending terminal sends a sharing request for sharing information to the second receiving terminal; and when the feedback result of the sharing request is that sharing is allowed, the sending terminal sends the sharing request to the first receiving terminal.

In an embodiment, before the step S200, the method further includes:

dividing the sharing information into at least one first sharing information and at least one second sharing information.

In an embodiment, the first preset condition and/or the second preset condition include at least one of the following:

the first receiving terminal can receive or process the first sharing information;

the first receiving terminal cannot receive or process the second sharing information;

the second receiving terminal can receive or process the first sharing information; and the second receiving terminal cannot receive or process the second sharing information.

In an embodiment, the processing the sharing information according to at least one first preset strategy and/or at least one second preset strategy includes at least one of the following:

in response to that both the first receiving terminal and the second receiving terminal are capable of receiving or processing the first sharing information and/or the second sharing information, sending the first sharing information and/or the second sharing information directly;

in response to that the first receiving terminal is capable of receiving or processing the first sharing information, sending the first sharing information to the first receiving terminal;

in response to that the second receiving terminal is capable of receiving or processing the second sharing information, sending the second sharing information to the second receiving terminal;

in response to that the first receiving terminal is not capable of receiving or processing the first sharing information and the second receiving terminal is capable of receiving or processing the first sharing information, converting the first sharing information into a third sharing information that can be received or processed by the first receiving terminal through the first conversion terminal, and sending the third sharing information to the first receiving terminal through the first conversion terminal; and in response to that the second receiving terminal is not capable of receiving or processing the second sharing information and the first receiving terminal is capable of receiving or processing the second sharing information, converting the second sharing information into a fourth sharing information that can be received or processed by the second receiving terminal through the second conversion terminal, and sending the fourth sharing information to the second receiving terminal through the second conversion terminal.

In an embodiment, the first preset condition and/or the second preset condition include at least one of the following:

the connection between the sending terminal and the first receiving terminal can be disconnected;

the connection between the sending terminal and the second receiving terminal can be disconnected;

sharing between the sending terminal and the first receiving terminal can be paused or resumed or terminated or prohibited; and sharing between the sending terminal and the second receiving terminal can be paused or resumed or terminated or prohibited.

In an embodiment, the sending the sharing information according to at least one first preset strategy or at least one second preset strategy includes at least one of the following:

in response to a first operation of the sending terminal, disconnecting from the first receiving terminal and/or the second receiving terminal;

in response to a second operation of the sending terminal, suspending or resuming or terminating or prohibiting sharing with the first receiving terminal and/or the second receiving terminal;

in response to a first operation of the first receiving terminal, disconnecting from the sending terminal and/or the second receiving terminal;

in response to a second operation of the first receiving terminal, suspending or resuming or terminating or prohibiting sharing with the sending terminal and/or the second receiving terminal;

in response to a first operation of the second receiving terminal, disconnecting from the sending terminal and/or the first receiving terminal; and in response to a second operation of the second receiving terminal, suspending or resuming or terminating or prohibiting sharing with the sending terminal and/or the first receiving terminal.

In an embodiment, after the step S300, the method further includes:

during a process of sending the sharing information to the first receiving terminal and the second receiving terminal, detecting whether the first preset condition that is not met by the first receiving terminal and/or the second preset condition that is not met by the second receiving terminal change; and in response to that the first preset condition that is not met by the first receiving terminal and/or the second preset condition that is not met by the second receiving terminal change, processing the sharing information according to a third preset strategy.

In an embodiment, the third method further includes at least one of the following:

determining the first conversion terminal according to the first sharing information and/or ability of an optional conversion terminal;

determining the second conversion terminal according to the second sharing information and/or ability of an optional conversion terminal;

when the first conversion terminal is the second receiving terminal, after the second receiving terminal finishes receiving the second sharing information, sending the first sharing information to the second receiving terminal for conversion; and when the second conversion terminal is the first receiving terminal, after the first receiving terminal finishes receiving the first sharing information, sending the second sharing information to the first receiving terminal for conversion.

The present application further provides a second information processing method, applied to a sending terminal, including the following steps:

S1000, in response to that first sharing information is sent to at least one first receiving terminal and second sharing information is sent to at least one second receiving terminal; and S2000, in response to that the first receiving terminal does not meet a first preset condition, processing the first sharing information and/or the second sharing information according to at least one first preset strategy; and/or in response to that the second receiving terminal does not meet a second preset condition, processing the first sharing information and/or the second sharing information according to at least one second preset strategy.

In an embodiment, the step S1000 includes at least one of the following:

in response to a preset operation of sending the first sharing information to at least one first receiving terminal and sending the second sharing information to at least one second receiving terminal;

in response to that the first sharing information starts to be sent to at least one first receiving terminal and the second sharing information starts to be sent to at least one second receiving terminal; and in response to that sending the first sharing information to at least one first receiving terminal and sending the second sharing information to at least one second receiving terminal are finished.

In an embodiment, the step S2000 includes at least one of the following:

dividing the first sharing information into at least one third sharing information and at least one fourth sharing information according to a remaining space of the first receiving terminal, the third sharing information or the fourth sharing information being sent to the second receiving terminal; dividing the second sharing information into at least one fifth sharing information and at least one sixth sharing information according to a remaining space of the second receiving terminal, the fifth sharing information or the sixth sharing information being sent to the first receiving terminal; dividing the first sharing information into at least one third sharing information and at least one fourth sharing information according to current states and/or modes and/or scenarios of the first receiving terminal;

dividing the second sharing information into at least one fifth sharing information and at least one sixth sharing information according to current states and/or modes and/or scenarios of the second receiving terminal;

after the second receiving terminal processes the sharing information sent to the first receiving terminal, sending the sharing information to the first receiving terminal; after the first receiving terminal processes the sharing information sent to the first receiving terminal, sending the sharing information to the second receiving terminal; the first preset condition including that the first receiving terminal has a preset authority, the second preset condition including that the second receiving terminal does not have a preset authority, and when a feedback of the second receiving terminal indicates that sharing is allowed, the first sharing information is sent to the first receiving terminal.

In an embodiment, the dividing the sharing information includes at least one of the following:

dividing the sharing information after compressing the sharing information;

compressing the sharing information respectively after dividing the sharing information;

dividing the sharing information after copying partial contents of the sharing information;

dividing the sharing information after converting a content and/or a format of the sharing information;

dividing the sharing information according to the remaining space of the first receiving terminal and the second receiving terminal;

dividing the sharing information according to current states and/or modes and/or scenarios of the first receiving terminal and the second receiving terminal.

In an embodiment, after the step S2000, the method further includes:

during a process of sending the sharing information to the first receiving terminal and the second receiving terminal, detecting whether the first preset condition that is not met by the first receiving terminal and/or the second preset condition that is not met by the second receiving terminal change; and in response to that the first preset condition that is not met by the first receiving terminal and/or the second preset condition that is not met by the second receiving terminal change, processing the sharing information according to a third preset strategy.

In an embodiment, the step S2000 further includes at least one of the following:

in response to that both the first receiving terminal and the second receiving terminal are capable of receiving or processing the first sharing information and/or the second sharing information, sending the first sharing information and/or the second sharing information directly;

in response to that the first receiving terminal is capable of receiving or processing the first sharing information, sending the first sharing information to the first receiving terminal;

in response to that the second receiving terminal is capable of receiving or processing the second sharing information, sending the second sharing information to the second receiving terminal;

in response to that the first receiving terminal is not capable of receiving or processing the first sharing information, converting the first sharing information into a seventh sharing information that can be received or processed by the first receiving terminal through at least one first conversion terminal, and sending the seventh sharing information to the first receiving terminal through the first conversion terminal; and in response to that the second receiving terminal is not capable of receiving or processing the second sharing information, converting the second sharing information into an eighth sharing information that can be received or processed by the second receiving terminal through at least one second conversion terminal, and sending the eighth sharing information to the second receiving terminal through the second conversion terminal.

In an embodiment, the method further includes at least one of the following:

determining the first conversion terminal according to the first sharing information and/or ability of an optional conversion terminal;

determining the second conversion terminal according to the second sharing information and/or ability of an optional conversion terminal;

when the first conversion terminal is the second receiving terminal, after the second receiving terminal finishes receiving the second sharing information, sending the first sharing information to the second receiving terminal for conversion; and when the second conversion terminal is the first receiving terminal, after the first receiving terminal finishes receiving the first sharing information, sending the second sharing information to the first receiving terminal for conversion.

The present application further provides a device including a memory and a processor. An information processing program is stored in the memory, and when the information processing program is executed by the processor, the information processing method according to any one of the above mentioned embodiments is implemented.

The present application relates to an information processing method and a device. The information processing method is applied to the sending terminal and includes the following steps: in response to that sharing information is sent to at least one first receiving terminal and at least one second receiving terminal; and in response to that the first receiving terminal does not meet a first preset condition, processing the sharing information according to at least one first preset strategy; and/or in response to that the second receiving terminal does not meet a second preset condition, processing the sharing information according to at least one second preset strategy. In the present application, based on the conditional determination and processing strategy of the receiving terminal, information can be shared easily and conveniently between different devices, thereby improving the user experience.

BRIEF DESCRIPTION OF THE DRAWINGS

The drawings herein are incorporated into the description and constitute a part of the description, show embodiments that conform to the present application, and are used together with the description to explain the principle of the present application. In order to more clearly describe the technical solutions of the embodiments of the present application, the following will briefly introduce the drawings that need to be used in the description of the embodiments. Obviously, those of ordinary skill in the art can obtain other drawings from these drawings without creative labor.

FIG. 6 is a schematic flowchart of the information processing method according to a second embodiment.

Figure 1:
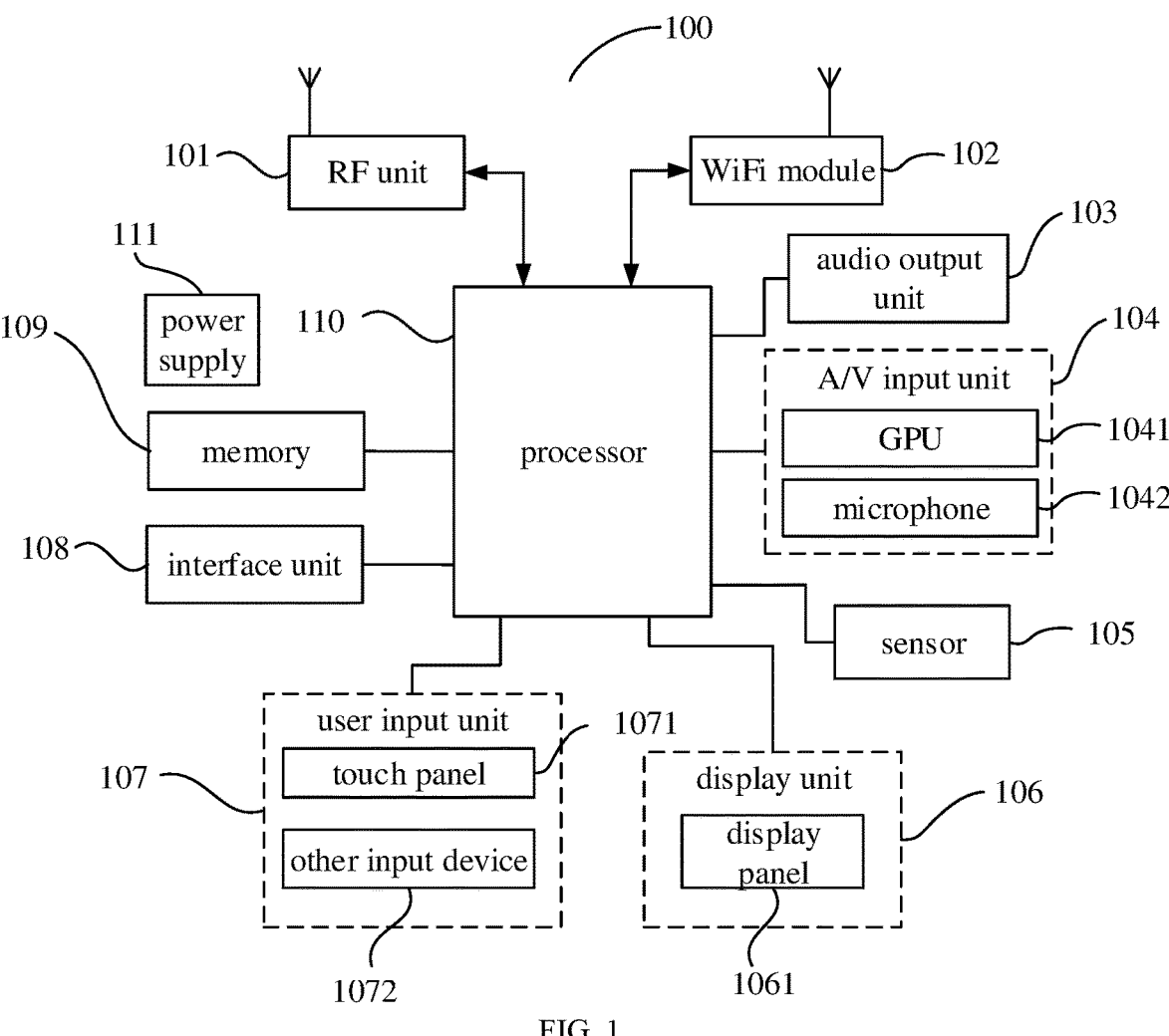
FIG. 1 is a schematic structural diagram of a hardware of an intelligent terminal for implementing embodiments of the present application.

The realization, functional features and advantages of the present application will be further described in conjunction with the embodiments and with reference to the accompanying drawings. By means of the above drawings, specific embodiments of the present application have been shown, which will be described in more detail hereinafter. These drawings and text descriptions are not intended to limit the scope of the concept of the application in any way, but to illustrate the concept of the application for those skilled in the art by referring to specific embodiments.

DETAILED DESCRIPTION OF THE EMBODIMENTS

The exemplary embodiments will be described in detail herein, and examples of which are illustrated in the accompanying drawings. When the following description refers to the accompanying drawings, the same numerals in different drawings refer to the same or similar elements unless otherwise indicated. The implementations described in the following exemplary embodiments do not represent all implementations consistent with the present application. Rather, they are merely examples of devices and methods consistent with aspects of the present application as recited in the appended claims.

It should be noted that in this document, the terms "comprise", "include" or any other variants thereof are intended to cover a non-exclusive inclusion. Thus, a process, method, article, or device that includes a series of elements not only includes those elements, but also includes other elements that are not explicitly listed, or also includes elements inherent to the process, method, article, or device. If there are no more restrictions, the element defined by the sentence "including a . . . " does not exclude the existence of other identical elements in the process, method, article or device that includes the element. In addition, components, features, and elements with the same name in different embodiments of the present application may have the same or different meanings. Its specific meaning needs to be determined according to its explanation in the specific embodiment or further combined with the context in the specific embodiment.

It should be understood that although the terms first, second, third, and the like may be used herein to describe various information, the information should not be limited to these terms. These terms are only used to distinguish information of the same type from one another. For example, without departing from the scope of this document, first information may also be called second information, and similarly, second information may also be called first information. Depending on the context, the word "if" as used herein may be interpreted as "at" or "when" or "in response to a determination". Furthermore, as used herein, the singular forms "a", "an" and "the" are intended to include the plural forms as well, unless the context indicates otherwise. It should be further understood that the terms "comprising", "including" indicate the existence of features, steps, operations, elements, components, items, species, and/or groups, but does not exclude the existence, occurrence or addition of one or more other features, steps, operations, elements, components, items, species, and/or groups. The terms "or", "and/or", "comprising at least one of" and the like used in the present application may be interpreted as inclusive, or mean any one or any combination. For example, "comprising at least one of: A, B, C" means "any of: A; B; C; A and B; A and C; B and C; A and B and C". As another example, "A, B, or C" or "A, B, and/or C" means "any of the following: A; B; C; A and B; A and C; B and C; A and B and C". Exceptions to this definition will only arise when combinations of elements, functions, steps or operations are inherently mutually exclusive in some way.

It should be understood that although the various steps in the flowchart in the embodiment of the present application are displayed sequentially as indicated by the arrows, these steps are not necessarily executed sequentially in the order indicated by the arrows. Unless otherwise specified herein, there is no strict order restriction on the execution of these steps, and they can be executed in other orders. Moreover, at least some of the steps in the figure may include multiple sub-steps or multiple stages, these sub-steps or stages are not necessarily executed at the same time, but can be executed at different times. The execution sequence thereof is not necessarily performed sequentially, but may be performed alternately or alternately with at least one part of other steps or sub-steps or stages of other steps.

Depending on the context, the words "if" as used herein may be interpreted as "at" or "when" or "in response to determining" or "in response to detecting". Similarly, depending on the context, the phrases "if determined" or "if detected (the stated condition or event)" could be interpreted as "when determined" or "in response to the determination" or "when detected (the stated condition or event)" or "in response to detection (the stated condition or event)".

It should be noted that in this article, step codes such as S1 and S2 are used for the purpose of expressing the corresponding content more clearly and concisely, and do not constitute a substantive limitation on the order. Those skilled in the art may perform S2 first and then S1 and the like during specific implementation, but these should all be within the protection scope of the present application.

It should be understood that the specific embodiments described here are only used to explain the present application, and are not intended to limit the present application.

In the following description, the use of suffixes such as "module", "part" or "unit" for denoting elements is only for facilitating the description of the present application and has no specific meaning by itself. Therefore, "module", "part" or "unit" may be used in combination.

The intelligent the terminal can be implemented in various forms. For example, the intelligent terminal described in the present application can include a mobile phone, a tablet computer, a notepad computer, a hand-held computer, a personal digital assistant (PDA), a portable media player (PMP), a navigation device, a wearable device, a smart bracelet, a pedometer and other intelligent terminals, as well as a fixed terminal such as a digital TV and a desktop computer.

The present application takes a mobile the terminal as an example to illustrate. Those skilled in the art will understand that, in addition to elements specifically used for mobile purposes, the configuration according to the embodiments of the present application can also be applied to the fixed terminal.

As shown in FIG. 1, FIG. 1 is a schematic structural diagram of a hardware of a mobile the terminal according to embodiments of the present application. The mobile terminal 100 can include a radio frequency (RF) unit 101, a WiFi module 102, an audio output unit 103, an audio/video (A/V) input unit 104, a sensor 105, a display unit 106, a user input unit 107, an interface unit 108, a memory 109, a processor 110, a power supply 111 and other components. Those skilled in the art can understand that the structure of the mobile terminal shown in FIG. 1 does not constitute a limitation on the mobile terminal. The mobile terminal can include more or fewer components, or a combination of some components, or differently arranged components than shown in the figure.

Hereinafter, each component of the mobile terminal will be specifically introduced with reference to FIG. 1.

The radio frequency unit 101 can be used for transmitting and receiving signals during the process of transceiving information or talking. Specifically, after receiving the downlink information of the base station, the downlink information is processed by the processor 110; in addition, the uplink data is sent to the base station. Generally, the radio frequency unit 101 includes, but is not limited to, an antenna, at least one amplifier, a transceiver, a coupler, a low noise amplifier, a duplexer, and the like. In addition, the radio frequency unit 101 can also communicate with the network and other devices through wireless communication. The above-mentioned wireless communication can use any communication standard or protocol, including but not limited to Global System of Mobile communication (GSM), General Packet Radio Service (GPRS), Code Division Multiple Access 2000 (CDMA2000), Wideband Code Division Multiple Access (WCDMA), Time Division-Synchronous Code Division Multiple Access (TD-SCDMA), Frequency Division Duplexing-Long Term Evolution (FDD-LTE), Time Division Duplexing-Long Term Evolution (TDD-LTE), or the like.

Wi-Fi is a short-range wireless transmission technology. The mobile terminal can help users transmit and receive email, browse webpage, and access streaming media through the Wi-Fi module 102, and Wi-Fi provides users with wireless broadband Internet access. Although FIG. 1 shows the Wi-Fi module 102, it is understandable that it is not a necessary component of the mobile the terminal and can be omitted as needed without changing the essence of the present application.

When the mobile terminal 100 is in a call signal receiving mode, a call mode, a recording mode, a voice recognition mode, a broadcast receiving mode, or the like, the audio output unit 103 can convert the audio data received by the radio frequency unit 101 or the Wi-Fi module 102 or stored in the memory 109 into an audio signal and output the audio signal as sound. Moreover, the audio output unit 103 can also provide audio output related to a specific function performed by the mobile terminal 100 (for example, call signal reception sound, message reception sound, or the like). The audio output unit 103 can include a loudspeaker box, a buzzer, or the like.

The A/V input unit 104 is configured to receive audio or video signals. The A/V input unit 104 can include a graphics processing unit (GPU) 1041 and a microphone 1042. The graphics processing unit 1041 processes image data of still pictures or videos obtained by an image capture device (such as a camera) in a video capture mode or an image capture mode. The processed image frame can be displayed on the display unit 106. The image frame processed by the graphics processing unit 1041 can be stored in the memory 109 (or other storage medium) or sent via the radio frequency unit 101 or the Wi-Fi module 102. The microphone 1042 can receive sound (audio data) in operation modes such as a call mode, a recording mode, a voice recognition mode, and the like, and can process such sound into audio data. The processed audio (voice) data can be converted into a format that can be sent to a mobile communication base station via the radio frequency unit 101 in the case of a call mode for output. The microphone 1042 can implement various types of noise cancellation (or suppression) algorithms to eliminate (or suppress) noise or interference generated during the process of transceiving audio signals.

The mobile terminal 100 also includes at least one sensor 105, such as a light sensor, a motion sensor, and other sensors. Specifically, the light sensor includes an ambient light sensor and a proximity sensor. The ambient light sensor can adjust the brightness of the display panel 1061 according to the brightness of the ambient light. The proximity sensor can turn off the display panel 1061 and/or the backlight when the mobile terminal 100 is moved to the ear. A gravity acceleration sensor, as a kind of motion sensor, can detect the size of acceleration in various directions (usually three axes). The gravity acceleration sensor can detect the size and direction of gravity when it is stationary, and can identify the gesture of the mobile terminal (such as horizontal and vertical screen switching, related games, magnetometer attitude calibration), vibration recognition related functions (such as pedometer, tap), or the like. The mobile terminal can also be equipped with other sensors such as a fingerprint sensor, a pressure sensor, an iris sensor, a molecular sensor, a gyroscope, a barometer, a hygrometer, a thermometer, an infrared sensor and other sensors, which will not be repeated here.

The display unit 106 is configured to display information input by the user or information provided to the user. The display unit 106 can include a display panel 1061, and the display panel 1061 can be configured in the form of a liquid crystal display (LCD), an organic light emitting diode (OLED), or the like.

The user input unit 107 can be configured to receive inputted numeric or character information, and generate key signal input related to user settings and function control of the mobile terminal. Specifically, the user input unit 107 can include a touch panel 1071 and other input devices 1072. The touch panel 1071, also called a touch screen, can collect user touch operations on or near it (for example, the user uses fingers, stylus and other suitable objects or accessories to operate on the touch panel 1071 or near the touch panel 1071), and drive the corresponding connection device according to a preset program. The touch panel 1071 can include two parts: a touch detection device and a touch controller. The touch detection device detects the user's touch position, detects the signal brought by the touch operation, and transmits the signal to the touch controller. The touch controller receives the touch information from the touch detection device, converts the touch information into contact coordinates, and sends it to the processor 110, and can receive and execute the instructions sent by the processor 110. In addition, the touch panel 1071 can be implemented in multiple types such as resistive, capacitive, infrared, and surface acoustic wave. In addition to the touch panel 1071, the user input unit 107 can also include other input devices 1072. Specifically, the other input devices 1072 can include, but are not limited to, one or more of physical keyboard, function keys (such as volume control buttons, switch buttons, and the like), trackball, mouse, joystick, and the like, which are not specifically limited here.

Further, the touch panel 1071 can cover the display panel 1061. After the touch panel 1071 detects a touch operation on or near it, the touch operation is transmitted to the processor 110 to determine the type of the touch event, and then the processor 110 provides a corresponding visual output on the display panel 1061 according to the type of the touch event. Although in FIG. 1, the touch panel 1071 and the display panel 1061 are used as two independent components to realize the input and output functions of the mobile terminal, in some embodiments, the touch panel 1071 and the display panel 1061 can be integrated to implement the input and output functions of the mobile terminal, which is not specifically limited here.

The interface unit 108 serves as an interface through which at least one external device can be connected to the mobile terminal 100. For example, the external device can include a wired or wireless earphone port, an external power source (or battery charger) port, a wired or wireless data port, a memory card port, a port for connecting devices with identification modules, an audio input/output (I/O) port, a video I/O port, an earphone port, or the like. The interface unit 108 can be configured to receive input (such as data information, electricity, or the like) from an external device and transmit the received input to one or more elements in the mobile terminal 100 or can be configured to transfer data between the mobile terminal 100 and the external device.

The memory 109 can be configured to store software programs and various data. The memory 109 can mainly include a program storage area and a data storage area. The program storage area can store the operating system, at least one application required by the function (such as sound play function, image play function, and the like), or the like. The data storage area can store data (such as audio data, phone book, and the like) created based on the use of the mobile phone. In addition, the memory 109 can include a high-speed random access memory, and can also include a non-volatile memory, such as at least one magnetic disk storage device, a flash memory device, or other volatile solid-state storage devices.

The processor 110 is a control center of the mobile terminal, and uses various interfaces and lines to connect the various parts of the entire mobile terminal. By running or performing the software programs and/or modules stored in the memory 109, and calling the data stored in the memory 109, various functions and processing data of the mobile the terminal are executed, thereby overall monitoring of the mobile terminal is performed. The processor 110 can include one or more processing units; and the processor 110 may integrate an application processor and a modem processor. The application processor mainly processes an operating system, a user interface, an application, or the like, and the modem processor mainly processes wireless communication. It can be understood that the foregoing modem processor may not be integrated into the processor 110.

The mobile terminal 100 can also include a power source 111 (such as a battery) for supplying power to various components. The power supply 111 can be logically connected to the processor 110 through a power management system, so that functions such as charging, discharging, and power consumption management can be managed through the power management system.

Although not shown in FIG. 1, the mobile terminal 100 can also include a Bluetooth module, or the like, which will not be repeated herein.

In order to facilitate the understanding of the embodiments of the present application, the following describes the communication network system on which the mobile terminal of the present application is based.

Figure 2:
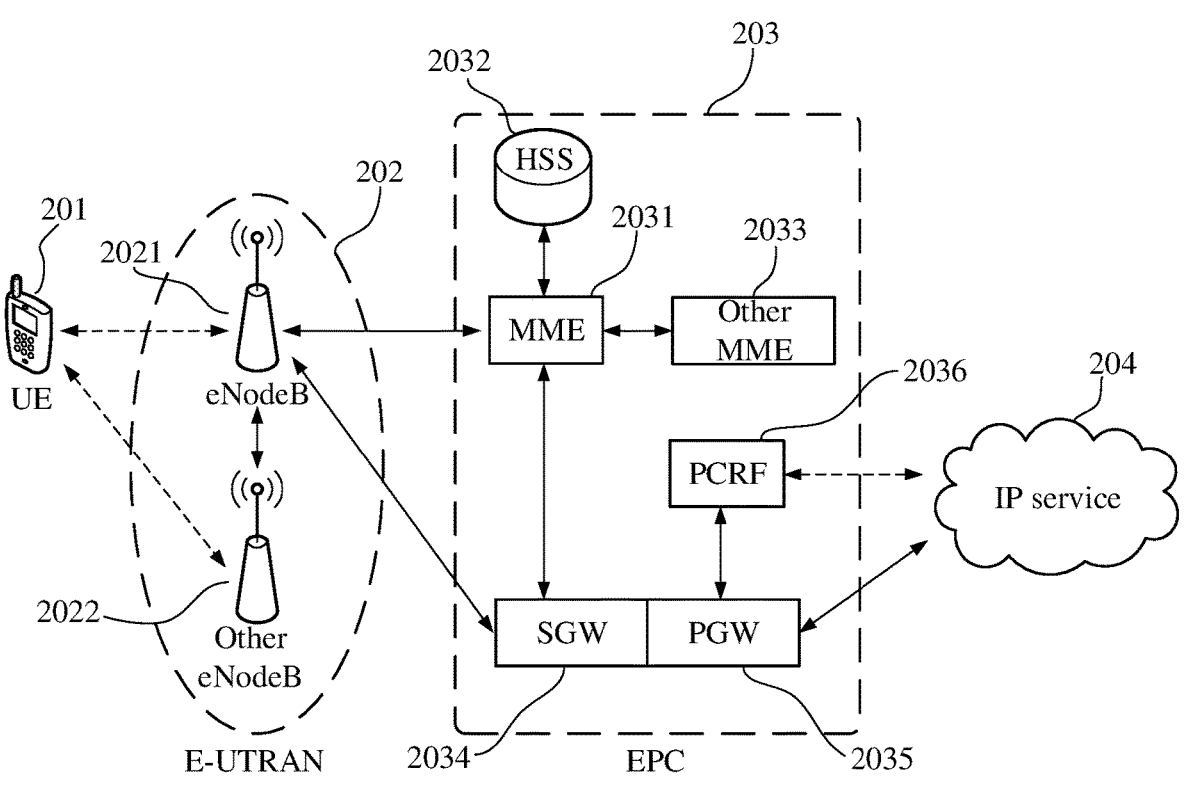
FIG. 2 is an architecture diagram of a communication network system according to an embodiment of the present application.

As shown in FIG. 2, FIG. 2 is an architecture diagram of a communication network system according to an embodiment of the present application. The communication network system is an LTE system of general mobile communication network technology. The LTE system includes a user equipment (UE) 201, an Evolved UMTS Terrestrial Radio Access Network (E-UTRAN) 202, an Evolved Packet Core (EPC) 203, and an operator's IP service 204 that are sequentially connected in communication.

Specifically, the UE 201 can be the aforementioned terminal 100, which will not be repeated here.

E-UTRAN 202 includes eNodeB 2021 and other eNodeBs 2022. The eNodeB 2021 can be connected to other eNodeBs 2022 through a backhaul (for example, an X2 interface), the eNodeB 2021 is connected to the EPC 203, and the eNodeB 2021 can provide access from the UE 201 to the EPC 203.

The EPC 203 can include Mobility Management Entity (MME) 2031, Home Subscriber Server (HSS) 2032, other MMEs 2033, Serving Gate Way (SGW) 2034, PDN Gate Way (PGW) 2035, Policy and Charging Rules Function (PCRF) 2036, and so on. MME 2031 is a control node that processes signaling between UE 201 and EPC 203, and provides bearer and connection management. HSS 2032 is configured to provide some registers to manage functions such as the home location register (not shown), and save some user-specific information about service feature, data rates, and so on. All user data can be sent through SGW 2034, PGW 2035 can provide UE 201 IP address allocation and other functions. PCRF 2036 is a policy and charging control policy decision point for service data flows and IP bearer resources, which selects and provides available policy and charging control decisions for policy and charging execution functional units (not shown).

The IP service 204 can include Internet, intranet, IP Multimedia Subsystem (IMS), or other IP services.

Although the LTE system is described above as an example, those skilled in the art should know that, the present application is not only applicable to the LTE system, but also applicable to other wireless communication systems, such as GSM, CDMA2000, WCDMA, TD-SCDMA, and new network systems in the future, or the like, which is not limited herein.

Based on the above mobile terminal hardware structure and communication network system, various embodiments of the present application are proposed.

Figure 3:
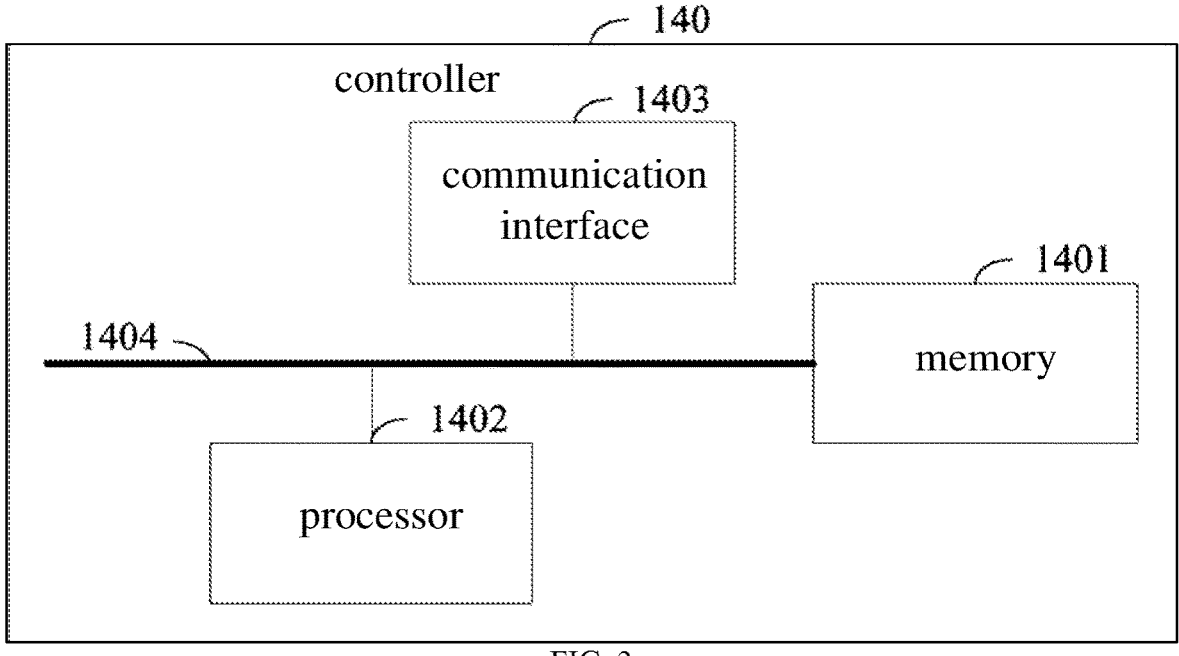
FIG. 3 is a schematic structural diagram of a hardware of a controller according to an embodiment of the present application.

FIG. 3 is a schematic structural diagram of a hardware of a controller according to embodiments of the present application. The controller 140 includes a memory 1401 and a processor 1402. The memory 1401 is used to store program instructions, and the processor 1402 is used to call the program instructions stored in the memory 1401 to execute the steps of the method of the present application.

In an embodiment, the above-mentioned controller 140 also includes a communication interface 1403, and the communication interface 1403 can be connected to the processor 1402 via a bus 1404. The processor 1402 can control the communication interface 1403 to implement the receiving and sending functions of the controller 140.

Figure 4:
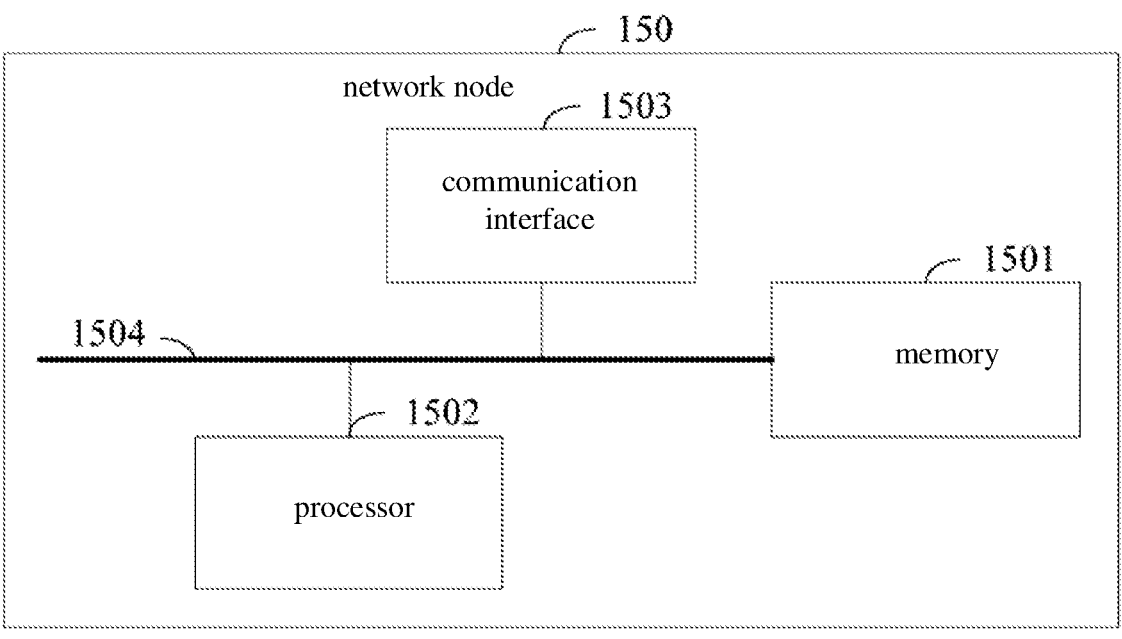
FIG. 4 is a schematic structural diagram of a hardware of a network node according to an embodiment of the present application.

FIG. 4 is a schematic structural diagram of a hardware of a network node according to embodiments of the present application. The network node 150 includes a memory 1501 and a processor 1502. The memory 1501 is used to store program instructions, and the processor 1502 is used to call the program instructions in the memory 1501 to execute the steps of the first node, intermediate node and/or tail node in the method of the present application.

In an embodiment, the above-mentioned network node 150 also includes a communication interface 1503, and the communication interface 1503 can be connected to the processor 1502 via a bus 1504. The processor 1502 can control the communication interface 1503 to implement the receiving and sending functions of the network node 150.

The above-mentioned integrated modules implemented in the form of software function modules can be stored in a computer-readable storage medium. The above-mentioned software function modules are stored in a storage medium, and include several instructions to make a computer device (which may be a personal computer, server, or network device, and the like) or a processor execute some steps of the methods described in various embodiments of the present application.

All or part of the above mentioned embodiments can be implemented by software, hardware, firmware, or any combination thereof. When being implemented by software, all or part of the above mentioned embodiments can be implemented in the form of a computer program product. The computer program product includes one or more computer instructions. When computer program instructions are loaded and executed on a computer, processes or functions according to embodiments of the present application are generated in whole or in part. The computer may be a general purpose computer, a special purpose computer, a computer network, or other programmable device. Computer instructions may be stored in the computer-readable storage medium, or may be transmitted from one computer-readable storage medium to another computer-readable storage medium. For example, the computer instructions may be transmitted from a website, computer, server or data center to another website site, computer, server or data center via a wired manner (for example, a coaxial-cable, optical fiber, digital subscriber line) or a wireless manner (for example, infrared, wireless, microwave, and the like). The computer-readable storage medium can be any available medium that can be accessed by a computer, or can be the data storage device such as servers and data centers integrated with one or more available media. The available medium may be the magnetic medium (for example, floppy disk, hard disk, magnetic tape), optical medium (for example, DVD), or semiconductor medium (for example, solid state disk), and the like.

Based on the above-mentioned mobile terminal hardware structure and communication network system, various embodiments of the present application are proposed.

The First Embodiment

Figure 5:
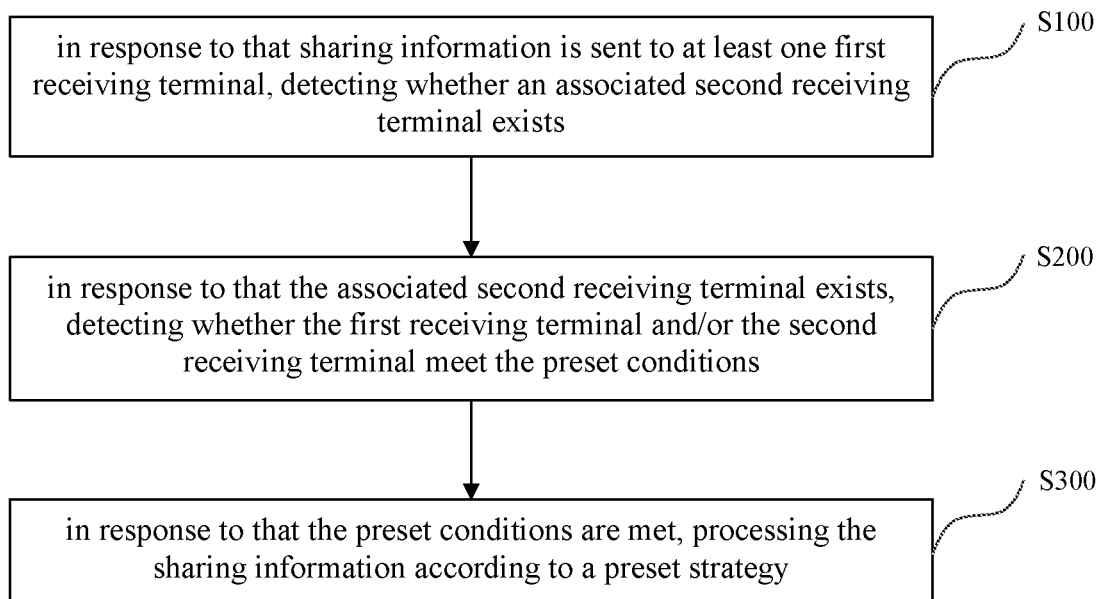
FIG. 5 is a schematic flowchart of the information processing method according to a first embodiment.

FIG. 5 is a schematic flowchart of the information processing method according to a third embodiment. As shown in FIG. 5, the information processing method of the present application is applied to the sending terminal and includes the following steps:

S100, in response to that sharing information is sent to at least one first receiving terminal, detecting whether an associated second receiving terminal exists;

S200, in response to that the associated second receiving terminal exists, detecting whether the first receiving terminal and/or the second receiving terminal meet the preset conditions; and S300, in response to that the preset conditions are met, processing the sharing information according to at least one preset strategy.

The sending terminal, the first receiving terminal, and the second receiving terminal may include terminal devices (such as mobile phones, tablet computers, and the like), wearable smart devices (such as smart watches, smart bracelets, smart headphones, and the like), smart home devices (such as smart TV, smart loudspeaker box, and the like), Internet of Vehicles device (such as smart cars, vehicle-mounted terminals, and the like), through the above method, based on the conditional determination, and collaboration and processing strategies among multi receiving terminals, information can be shared between different devices conveniently and quickly, thereby improving the user experience.

In an embodiment, the step S100 includes at least one of the following:

in response to a preset operation of sending the sharing information to at least one first receiving terminal;

in response to that the sharing information starts to be sent to at least one first receiving terminal; and in response to that sending the sharing information to at least one first receiving terminal is finished.

In an embodiment, the preset operation is used to express sharing intention, including at least one of operations such as selecting sharing information, determining or generating sharing information, selecting the sharing object, determining to start sharing, and the like. In different stages of sending sharing information, that is, in any stage of having the sharing intention, starting sending sharing information and finishing sending sharing information, the sharing information can be processed differently based on the conditional determination and processing strategy of the receiving terminal, to finish the information sharing. For example, in the stage of having the sharing intention, the processing strategy such as prohibiting sharing, sharing after the authority is determined, delaying sharing, and the like can be determined according to the analysis on the type and size of the sharing information, the storage space of the receiving terminal and the sending terminal, the electric quantity, the scenario, the mode and other information. After starting sending the sharing information, the processing strategy such as canceling sharing, pausing sharing, and the like can be determined based on the scenario and mode changes of the receiving terminal and the sending terminal. After finishing sending the sharing information, according to conditions such as the authority of the receiving terminal and whether the information can be withdrawn, the processing strategy such as withdrawing the sharing information, notifying the associated terminal, and the like can be determined. In this way, users can get a more flexible and convenient sharing experience at any stage of sharing information, and moreover, information security during the sharing process can be improved.

In an embodiment, the associated second receiving terminal may be any device connected and/or bound to the sending terminal and/or the first receiving terminal. In an embodiment, the connection may be a direct connection or an indirect connection.

In an embodiment, binding may mean that the login account information is the same, or a matching connection, or through user-defined settings, and the like.

In an embodiment, the step S100 includes at least one of the following:

detecting whether an associated second receiving terminal exists according to terminal association information of the sending terminal and/or the first receiving terminal;

detecting whether the associated second receiving terminal exists according to the content and/or type of the sharing information; and detecting whether the associated second receiving terminal exists according to the mode and/or scenario of the sending terminal and/or the first receiving terminal.

In an embodiment, the terminal association information may be a binding relationship between terminals, an authority affiliation relationship, and the like, indicating that terminal association information exists between the sending terminal and/or the first receiving terminal. For example, there is an authority affiliation relationship between the terminal used by children and the terminal used by parents, and there is a binding relationship between the lighting device in the living room and the user's mobile phone. The content and/or type of sharing information can be associated with the corresponding terminal device. For example, when the sharing information is the contact information, the associated device can be the terminal used by the user corresponding to the contact information. When the sharing information is important files, the associated device can be the original issuing device of this important file. The sending terminal and/or the first receiving terminal can be associated with the corresponding terminal device according to the current mode and/or scenario. For example, if the terminal is currently in the children mode, the terminal can be associated with the parent's terminal, and if the terminal is currently in the driving mode, the terminal can be associated with a certain passenger's terminal.

The associated second receiving terminal can be used to authenticate and share the authority and abilities of the sending terminal or receiving terminal. In one scenario, the terminal A can be assigned to share the storage space with the terminal B. When the terminal A receives a file sent by the sending terminal, the terminal B is the associated receiving terminal of the terminal A. The sending terminal can divide the file and send the divided file to the terminal A and the terminal B respectively, or only send the divided file to the terminal B to avoid insufficient storage space of the terminal A. In another scenario, when children use their own mobile phones for projection screen on TV. The TV can send an authentication request to the parent's mobile phone bound to the children's mobile phone. After receiving determination information that allows projection screen, the TV can screen the contents of children's mobile phones.

In an embodiment, the preset condition includes that the first receiving terminal does not meet the first preset condition and/or the second receiving terminal does not meet the second preset condition. The step S300 includes:

when the first receiving terminal does not meet the first preset condition, processing the sharing information according to at least one first preset strategy; and/or when the second receiving terminal does not meet the second preset condition, processing the sharing information according to at least one second preset strategy.

In an embodiment, the first preset condition includes at least one of the following:

being in the preset mode or preset scenario;

having a preset authority;

the state being in a preset state, in an embodiment, the preset state including that the traffic is greater than or equal to the preset traffic, the electric quantity is greater than or equal to the preset electric quantity, and the storage space is greater than or equal to the preset size; and meeting the use conditions with preset functions.

In an embodiment, the second preset condition includes at least one of the following:

not being in the preset mode or preset scenario;

not having a preset authority;

the state not being in a preset state, in an embodiment, the preset state including that the traffic is greater than or equal to the preset traffic, the electric quantity is greater than or equal to the preset electric quantity, and the storage space is greater than or equal to the preset size; and not meeting the use conditions with preset functions.

In an embodiment, the preset mode may be the mobile operator network mode, the wireless network mode, the power saving mode, the hands-free mode, the preset language mode, the smart mode, the sharing mode, the Internet of Things mode, and the like. The preset scenarios can be the work scenario, the conference scenario, the entertainment scenario, the game scenario, the driving scenario, the navigation scenario, the outdoor scenario, and the like. The preset authority can be the identity authority, the sharing authority, the receiving authority, and the like. The state can be the electric quantity states, the traffic state, the storage space size, and the like. The preset function can be the translation function, the presentation function, the compression or decompression function, the encryption or decryption function, the format conversion function, the image processing function, and the like. When the first receiving terminal does not meet the first preset condition and the second receiving terminal does not meet the second preset condition, it means that the first receiving terminal cannot receive or process the sharing information and the second receiving terminal can receive or process the sharing information, or, at least one of the first receiving terminal and the second receiving terminal has the ability and/or authority to receive or process the sharing information. In this case, the sharing information can be processed by adopting corresponding strategies based on the abilities and/or authority of the first receiving terminal and the second receiving terminal, to obtain a better sharing experience.

In an embodiment, the processing the sharing information according to at least one first preset strategy includes at least one of the following:

pausing sharing with the first receiving terminal;

canceling sharing with the first receiving terminal;

delaying sharing with the first receiving terminal, and/or starting or resuming sharing with the first receiving terminal until the first receiving terminal meets the first preset condition;

outputting prompt information, and/or in response to determining a first sharing operation, starting or resuming sharing with the first receiving terminal; and withdrawing information shared to the first receiving terminal.

In an embodiment, the processing the sharing information according to at least one second preset strategy includes:

if the sharing information needs to be sent to the first receiving terminal, processing the sharing information through the second receiving terminal;

performing at least one of the following processing on the processed sharing information:

delaying sharing with the first receiving terminal, and/or after the first receiving terminal meets the first preset condition, starting or resuming sharing with the first receiving terminal;

outputting prompt information, and/or in response to determining the second sharing operation, starting or resuming sharing with the first receiving terminal.

In an embodiment, when the first receiving terminal does not meet the first preset condition, it means that the first receiving terminal is not in a preset mode or preset scenario, does not have the preset authority, is not in a preset state, or does not meet use conditions with the preset functions. In this case, the sharing with the first receiving terminal can be paused, delayed or canceled, or the sharing with the first receiving terminal can be started or resumed until the first receiving terminal meets the first preset condition, or the prompt information can be outputted to prompt potential problems in the current sharing, or the sharing with the first receiving terminal can be started or resumed based on the sharing operation. For example, when the network condition is poor, sharing is paused; or when the traffic of the receiving terminal receiving sharing information is insufficient, sharing is paused or canceled; or when the storage space of the receiving terminal receiving sharing information is insufficient, sharing can be canceled or delayed to avoid that the sharing information can only be partially received or fails to be received; or when some sharing information cannot be supported by the receiving terminal, sharing can be canceled or the sharing information can be sent to the terminal that can convert the information format and then the sharing information is reshared after the sharing information is processed by the terminal; or when some information cannot be shared (such as the WeChat voice cannot be shared), the information can be automatically filtered for canceling sharing the information, and a prompt can be outputted.

In some scenarios, when the receiving terminal is in a driving scenario, sharing the information can be delayed or the sharing information can be sent to the associated second receiving terminal, and then the sharing is resumed until the receiving terminal finishes the driving scenario, to avoid that the receiving terminal user checks the sharing information inconveniently or the driving safety is affected when the receiving terminal user checks the sharing information during driving; or when the language mode of the receiving terminal is Chinese and the language of the sharing information is French, the sharing information can be translated through the second receiving terminal, and then be shared, to avoid that the user of the first receiving terminal cannot obtain the content of the sharing information; or when the first receiving terminal cannot decrypt files, the file can be decrypted through the second receiving terminal and then sent to the first receiving terminal, which is more convenient and can improve communication efficiency.

In an embodiment, when the first receiving terminal does not meet the first preset condition and/or the second receiving terminal does not meet the second preset condition, at least one first preset strategy and/or at least one second preset strategy can be determined according to the first preset condition that is not met by the first receiving terminal and/or the second preset condition that is not met by the second receiving terminal and the content or type of the sharing information, then the sharing information is processed according to the determined at least one first preset strategy and/or at least one second preset strategy. For example, when the remaining traffic of the first receiving terminal is lower than the threshold and the first receiving terminal is not in the wireless connection mode, and the remaining traffic of the second receiving terminal is higher than or equal to the threshold, the shared information is a larger file. In this case, sharing with the first receiving terminal can be delayed to avoid consuming the traffic of the first receiving terminal when transmitting the file, and sharing with the first receiving terminal can be resumed when the first receiving terminal is in the wireless connection mode. Or the sharing information can be sent to the second receiving terminal first, and the sharing information will be sent to the first receiving terminal from the second receiving terminal until the first receiving terminal is in the wireless connection mode. Or, when the electric quantity of the first receiving terminal is lower than the threshold and the first receiving terminal cannot support the files of the sharing information in the corresponding format, and the electric quantity of the second receiving terminal is higher than or equal to the threshold and the second receiving terminal can support the files of the sharing information in the corresponding format, sharing with the first receiving terminal can be canceled. After the file is sent to the second receiving terminal for processing and converted into a format that can be supported by the first receiving terminal, the second receiving terminal will share the processed file to the first receiving terminal when the electric quantity of the first receiving terminal is higher than or equal to the threshold. In this way, when sharing information, the abilities of the device participating in information sharing can be fully considered, which can achieve reasonable use of device abilities, effectively avoid or reduce the adverse effects caused in the information sharing process, and improve the experience of various users.

In an embodiment, the processing the sharing information according to at least one first preset strategy, and/or processing the sharing information according to at least one second preset strategy includes at least one of the following:

pausing sharing with the first receiving terminal and/or the second receiving terminal;

canceling sharing with the first receiving terminal and/or the second receiving terminal;

delaying sharing with the first receiving terminal and/or the second receiving terminal, and/or starting or resuming sharing with the first receiving terminal and/or the second receiving terminal until the first receiving terminal meets the first preset condition and/or the second receiving terminal meets the second preset condition;

outputting prompt information, and/or in response to determining a first sharing operation, starting or resuming sharing with the first receiving terminal and/or the second receiving terminal;

withdrawing information shared to the first receiving terminal and/or the second receiving terminal;

dividing the sharing information into at least one first sharing information and at least one second sharing information according to a remaining space of the first receiving terminal and the second receiving terminal; and dividing the sharing information into at least one first sharing information and at least one second sharing information according to current states, and/or modes, and/or scenarios of the first receiving terminal and the second receiving terminal.

In an embodiment, the first preset condition is the same as the second preset condition, which includes at least one of the following:

being in the preset mode or preset scenario;

having a preset authority;

the state being in a preset state, in an embodiment, the preset state including that the traffic is greater than or equal to the preset traffic, the electric quantity is greater than or equal to the preset electric quantity, and the storage space is greater than or equal to the preset size; and meeting the use conditions with preset functions.

When the first receiving terminal does not meet the first preset condition and the second receiving terminal does not meet the second preset condition, sharing with the first receiving terminal and the second receiving terminal can be paused, or sharing with the first receiving terminal and the second receiving terminal can be canceled, or sharing with the first receiving terminal and the second receiving terminal can be delayed, or sharing with the first receiving terminal and the second receiving terminal can be started or resumed when the first receiving terminal meets the first preset condition and/or the second receiving terminal meets the second preset condition, or prompt information can be outputted, or sharing with the first receiving terminal and the second receiving terminal can be started or resumed in response to determining the first sharing operation, or information shared to the first receiving terminal and/or the second receiving terminal can be withdrawn. In actual implementation, when the first receiving terminal does not meet the first preset condition and the second receiving terminal does not meet the second preset condition, one of the receiving terminals can be selected for sending, thereby pausing the sharing with the first receiving terminal or the second receiving terminal, or canceling the sharing with the first receiving terminal or the second receiving terminal, or delaying the sharing with the first receiving terminal or the second receiving terminal, to meet the sending terminal's need to send sharing information. For example, the electric quantity of the terminal A and the terminal B is both lower than the threshold, but the electric quantity of the terminal A is more than the terminal B, so that the file can be sent to the terminal A. This scenario can be applied to situations which have special requirements for the immediacy of information transmission, such as important files are transmitted, the electric quantity of the sending terminal is low, the sending terminal transfers authority, and the like. In this way, smooth information sharing can be ensured.

In an embodiment, when the first receiving terminal does not meet the first preset condition and/or the second receiving terminal does not meet the second preset condition, for example, when at least one of the receiving terminals has insufficient remaining space, the sharing information can be divided into at least one first sharing information and at least one second sharing information according to the remaining space of the first receiving terminal and the second receiving terminal, so that the sharing information can be actively divided to make the size of the sharing information match with the remaining capacity of the receiving terminal, or match the remaining space of one of the receiving terminals.

In an embodiment, when the first receiving terminal does not meet the first preset condition and/or the second receiving terminal does not meet the second preset condition, the sharing information is divided into at least one first sharing information and at least one second sharing information according to the current state, and/or the mode, and/or the scenario of the first receiving terminal and the second receiving terminal. When at least one of the first receiving terminal and the second receiving terminal is not in a preset state, a preset scenario or a preset mode, the sharing information can be divided into at least one first sharing information and at least one second sharing information. For example, the first sharing information may be sent to the receiving terminal that meets the processing conditions, and the second sharing information may not be sent to the receiving terminal that does not meet the processing conditions temporarily, so that the receiving terminal that meets the processing conditions can process the sharing information first. For example, in a conference, when the terminal A is in the mode of connecting with the conference projection, and the terminal B is not in the mode of connecting with the loudspeaker box. Then the terminal C can send the video or image file in the sharing information to the terminal A for projection first, without sharing the audio file in the sharing information to the terminal B temporarily, to avoid affecting the current process of the terminal B.

In an embodiment, the processing the sharing information according to at least one second preset strategy also includes:

if the sharing information needs to be sent to the first receiving terminal, the sharing information is processed through the second receiving terminal.

In an embodiment, at least one of the following processing is performed on the processed sharing information:

delaying sharing with the first receiving terminal, and/or after the first receiving terminal meets the first preset condition, starting or resuming sharing with the first receiving terminal;

outputting prompt information, and/or in response to determining the second sharing operation, starting or resuming sharing with the first receiving terminal.

When the first receiving terminal cannot receive the sharing information, the sharing information can be processed through the second receiving terminal and then sent to the first receiving terminal. Therefore, when the sending terminal shares information with multiple receiving terminals, the workload of data sending, receiving and processing in the sending terminal can be reduced. After being processed by the second receiving terminal, the sharing information can be directly sent to the first receiving terminal, or can be processed according to the situation of the first receiving terminal. The processing includes at least one of delaying the sharing with the first receiving terminal, starting or resuming sharing with the first receiving terminal until the first receiving terminal meets the first preset condition, outputting prompt information, or starting or resuming sharing with the first receiving terminal in response to determining the second sharing operation. In this way, the transmit-receiving ability of the first receiving terminal and the second receiving terminal can be considered on the basis that the sharing requirements of the sending terminal are met.

In an embodiment, before the step S200, the sending terminal may divide the sharing information into at least one first sharing information and/or at least one second sharing information. The processing sharing information into at least one first sharing information and at least one second sharing information includes at least one of the following:

dividing the sharing information into at least one first sharing information and/or at least one second sharing information after the sharing information is compressed;

compressing the first sharing information and/or the second sharing information after the sharing information is divided into at least one first sharing information and/or at least one second sharing information;

after copying partial contents of the sharing information, dividing the sharing information into at least one first sharing information and/or at least one second sharing information;

dividing the sharing information into at least one first sharing information and/or at least one second sharing information according to the size of the sharing information, and the remaining space of the first receiving terminal and the second receiving terminal;

dividing the sharing information into at least one first sharing information and at least one second sharing information according to the types and/or formats of the sharing information, and information types and/or formats supported by the first receiving terminal and the second receiving terminal; and dividing the sharing information into at least one first sharing information and at least one second sharing information according to current states, and/or modes, and/or scenarios of the first receiving terminal and the second receiving terminal.

By dividing the sharing information, the sharing information can be converted into unit parts that are more suitable for processing. For each unit part of the sharing information, the abilities of the devices participating in information sharing can be better allocated and used, and the efficiency of information sharing can be improved. The sharing information that can be divided can be at least one file in a folder, at least one file in a compressed file, at least one file sent continuously, and the like. In an embodiment, when dividing the sharing information, the user can also modify at least one first sharing information and at least one second sharing information determined by the sending terminal, and obtain updated first sharing information and at least one second sharing information, and then process and share at least one first sharing information and at least one second sharing information.

In one scenario, when the sharing information file is large, the remaining space of the first receiving terminal is small, and the remaining space of the second receiving terminal is large, the sharing information is divided into at least one first sharing information and at least one second sharing information. The size of the space occupied by the first sharing information and the second sharing information is different, then the sharing information with the appropriate size is sent according to the remaining space of the first receiving terminal and the second receiving terminal. For example, in a conference, when the terminal A and the terminal B are connected to the conference projection, the terminal C can send the sharing files to the terminal A and the terminal B respectively according to the space size of the terminal A and the terminal B, so that the sharing can be quickly realized and displayed on the conference projection.

In one scenario, when the information types and/or formats supported by the receiving terminal are different, the sharing information can be divided into at least one first sharing information and at least one second sharing information according to the type and/or format of the information that are supported by the terminals. This allows sharing information of the corresponding type and/or format to be sent to the adapted receiving terminal. For example, in a conference, when the terminal A and the terminal B are both connected to the conference projection, and the terminal C can send the sharing files in the file formats supported by the terminal A and the terminal B to the terminal A and the terminal B respectively, to realize quick sharing and display the sharing information on the conference projection.

In one scenario, when the state, the scenario or the mode of the receiving terminal are different, the sharing information can be divided into at least one first sharing information and at least one second sharing information, so that the corresponding sharing information can be processed by the corresponding receiving terminal. For example, in a conference, when the terminal A is connected to the conference projection and the terminal B is connected to the loudspeaker box, the terminal C can send the video or image files in the sharing information to the terminal A and send the audio files in the sharing information to the terminal B, so that the sharing can be quickly realized and displayed on the conference projection.

In an embodiment, the first preset condition and/or the second preset condition include at least one of the following:

the first receiving terminal can receive or process the first sharing information;

the first receiving terminal cannot receive or process the second sharing information;

the second receiving terminal can receive or process the first sharing information; and the second receiving terminal cannot receive or process the second sharing information.

In an embodiment, the processing the sharing information according to at least one first preset strategy or at least one second preset strategy includes at least one of the following:

in response to that both the first receiving terminal and the second receiving terminal are capable of receiving or processing the first sharing information and/or the second sharing information, sending the first sharing information and/or the second sharing information directly;

in response to that the first receiving terminal is capable of receiving or processing the first sharing information, sending the first sharing information to the first receiving terminal;

in response to that the second receiving terminal is capable of receiving or processing the second sharing information, sending the second sharing information to the second receiving terminal;

in response to that the first receiving terminal is not capable of receiving or processing the first sharing information, converting the first sharing information into a third sharing information that can be received or processed by the first receiving terminal through the first conversion terminal, and sending the third sharing information to the first receiving terminal through the first conversion terminal; and in response to that the second receiving terminal is not capable of receiving or processing the second sharing information, converting the second sharing information into a fourth sharing information that can be received or processed by the second receiving terminal through the second conversion terminal, and sending the fourth sharing information to the second receiving terminal through the second conversion terminal.

In an embodiment, the method further includes at least one of the following:

determining the first conversion terminal according to the first sharing information and/or ability of an optional conversion terminal;

determining the second conversion terminal according to the second sharing information and/or ability of an optional conversion terminal;

when the first conversion terminal is the second receiving terminal, after the second receiving terminal finishes receiving the second sharing information, sending the first sharing information to the second receiving terminal for conversion; and when the second conversion terminal is the first receiving terminal, after the first receiving terminal finishes receiving the first sharing information, sending the second sharing information to the first receiving terminal for conversion.

In an embodiment, the first conversion terminal is the sending terminal and/or the second receiving terminal and/or the server and/or at least one other device; and/or the second conversion terminal is the sending terminal and/or the first receiving terminal and/or the server and/or at least one other device. In an embodiment, if the first receiving terminal cannot receive or process the first sharing information and the second receiving terminal can receive or process the first sharing information, the first conversion terminal is determined to be the second receiving terminal. In an embodiment, if the second receiving terminal cannot receive or process the second sharing information and the first receiving terminal can receive or process the second sharing information, the second conversion terminal is determined to be the first receiving terminal. In an embodiment, when sending the first sharing information to the second receiving terminal for conversion or when sending the second sharing information to the first receiving terminal for conversion, the processing manner same as the first preset strategy or the second preset strategy described above can be adopted to send the information, which will not be repeated here.

The first preset condition and the second preset condition represent the ability of the first receiving terminal and the second receiving terminal to receive and process the sharing information. The receiving ability can be determined by network signal strength, storage space size, authority, and the like. The processing ability can be determined by the software configuration, hardware configuration, and the like of the receiving terminal. When one of the receiving terminals cannot receive or process the corresponding sharing information, another receiving terminal and/or the sending terminal and/or the server and/or at least one other device can process the corresponding sharing information and then send the sharing information to the corresponding receiving terminal. For example, in a conference, when the terminal A is connected to the conference projection and the terminal B is connected to the loudspeaker box, the terminal C can send the video or image files in the sharing information to the terminal A and send the audio files in the sharing information to the terminal B. However, if the terminal C detects that the terminal B does not support the format of the audio file and the terminal A supports the format conversion of the audio file. In this case, the terminal C can send the audio file to the terminal A for format conversion, and then the terminal A sends the audio file to the terminal B, to achieve quick and accurate sharing.

In an embodiment, the first preset condition and/or the second preset condition include at least the following:

the connection between the sending terminal and the first receiving terminal can be disconnected;

the connection between the sending terminal and the second receiving terminal can be disconnected;

sharing between the sending terminal and the first receiving terminal can be paused or resumed or terminated or prohibited;

sharing between the sending terminal and the second receiving terminal can be paused or resumed or terminated or prohibited.

In an embodiment, the sending the sharing information according to at least one first preset strategy or at least one second preset strategy includes at least one of the following:

in response to a first operation of the sending terminal, disconnecting from the first receiving terminal and/or the second receiving terminal;

in response to a second operation of the sending terminal, suspending or resuming or terminating or prohibiting sharing with the first receiving terminal and/or the second receiving terminal;

in response to a first operation of the first receiving terminal, disconnecting from the sending terminal and/or the second receiving terminal;

in response to a second operation of the first receiving terminal, suspending or resuming or terminating or prohibiting sharing with the sending terminal and/or the second receiving terminal;

in response to a first operation of the second receiving terminal, disconnecting from the sending terminal and/or the first receiving terminal; and in response to a second operation of the second receiving terminal, suspending or resuming or terminating or prohibiting sharing with the sending terminal and/or the first receiving terminal.

In an embodiment, the first operation and/or the second operation include at least one of the following: the touch operation, the air separation operation, the voice control, and the key operation.

During the process of information sharing, based on at least one of the touch operation, the air separation operation, the voice control, and the key operation, the connection between the sending terminal and the receiving terminal can be disconnected, or the sharing between the sending terminal and the receiving terminal can be paused or resumed or terminated or prohibited. In this way, each user participating in information sharing can independently control the sharing process when sharing information, which is more user-friendly and can collaboratively improve the sharing accuracy. For example, the terminal A starts sending a larger file to the terminal B, although the terminal A determines that the size of the file matches the remaining space of the terminal B, the user of the terminal B thinks that the file is still too large or can be shared in a more appropriate way, then the terminal B can be operated to stop sharing. Or, the terminal A starts sending a confidential file to the terminal B, but during the file sending process, it is found that the sent file is wrong, then the user of the terminal A can stop sharing or make the terminal A disconnected from the terminal B. Or, the terminal A starts sending contact information to the terminal B, but the user of the terminal C corresponding to the contact information is not allowed to share the contact information. Then the user of the terminal C can operate the terminal C to send a stop sharing instruction to the terminal A, to stop the sharing between the terminal A and the terminal B or disconnect the connection between the terminal A and the terminal B.

In an embodiment, before the step S200 or the step S300, the method also includes:

detecting whether the sending terminal is in a preset mode or a preset scenario, and if so, executing the step S200 or the step S300; and/or if not, not executing the step S200 or the step S300 and/or outputting prompt information.

The preset mode or scenario in which the sending terminal is in may be modes or scenarios that allow information sharing between multiple devices, such as the sharing mode, a smart mode, the conference scenario, the multi-person conversation scenario, the multi-device connection scenario, and the like. Or, the preset mode or scenario in which the sending terminal is in may be modes or scenarios that the authority needs to be authenticated, such as the children mode, the elderly mode, the monitoring scenario, the confidential scenario, and the like. When the sending terminal is not in the preset mode or preset scenario, the step S200 or the step S300 does not need to be executed and/or prompt information is outputted. Through the prompt information, the user can change the mode or scenario of the sending terminal to meet the processing requirements, or can input authorization information, such as the password, the verification code, the fingerprint, the face information, and the like to proceed with the step S200 or the step S300. By determining the preset mode or scenario of the receiving terminal, it can be ensured that sharing behavior is carried out under a safe and reasonable condition, to avoid data leakage or other adverse effects on users.

In an embodiment, the processing the sharing information according to at least one first preset strategy, and/or processing the sharing information according to at least one second preset strategy includes at least one of the following:

pausing sharing with the first receiving terminal and/or the second receiving terminal;

canceling sharing with the first receiving terminal and/or the second receiving terminal;

delaying sharing with the first receiving terminal and/or the second receiving terminal, and/or starting or resuming sharing with the first receiving terminal and/or the second receiving terminal until the first receiving terminal meets the first preset condition and/or the second receiving terminal meets the second preset condition;

outputting prompt information, and/or in response to determining a first sharing operation, starting or resuming sharing with the first receiving terminal and/or the second receiving terminal;

withdrawing information shared to the first receiving terminal and/or the second receiving terminal.

In an embodiment, the first preset condition is the same as the second preset condition, which includes at least one of the following:

being in the preset mode or preset scenario;

having a preset authority;

the state being in a preset state, in an embodiment, the preset state including that the traffic is greater than or equal to the preset traffic, the electric quantity is greater than or equal to the preset electric quantity, and the storage space is greater than or equal to the preset size; and meeting the use conditions with preset functions.

When the first receiving terminal does not meet the first preset condition and the second receiving terminal does not meet the second preset condition, sharing with the first receiving terminal and the second receiving terminal can be paused, or sharing with the first receiving terminal and the second receiving terminal can be canceled, or sharing with the first receiving terminal and the second receiving terminal can be delayed, or sharing with the first receiving terminal and the second receiving terminal can be started or resumed when the first receiving terminal meets the first preset condition and/or the second receiving terminal meets the second preset condition, or prompt information can be outputted, or sharing with the first receiving terminal and the second receiving terminal can be started or resumed in response to determining the first sharing operation, or information shared to the first receiving terminal and/or the second receiving terminal can be withdrawn. In actual implementation, when the first receiving terminal does not meet the first preset condition and the second receiving terminal does not meet the second preset condition, one of the receiving terminals can be selected for sending, thereby pausing the sharing with the first receiving terminal or the second receiving terminal, or canceling the sharing with the first receiving terminal or the second receiving terminal, or delaying the sharing with the first receiving terminal or the second receiving terminal, to meet the sending terminal's need to send sharing information. For example, the electric quantity of the terminal A and the terminal B is both lower than the threshold, but the electric quantity of the terminal A is more than the terminal B, so that the file can be sent to the terminal A. This scenario can be applied to situations which have special requirements for the information transmission, such as important files are transmitted, the electric quantity of the sending terminal is low, the sending terminal transfers authority, and the like. In this way, smooth information sharing can be ensured.

In an embodiment, the processing the sharing information according to at least one second preset strategy also includes:

if the sharing information needs to be sent to the first receiving terminal, the sharing information is processed through the second receiving terminal.

In an embodiment, at least one of the following processing is performed on the processed sharing information:

delaying sharing with the first receiving terminal, and/or after the first receiving terminal meets the first preset condition, starting or resuming sharing with the first receiving terminal;

outputting prompt information, and/or in response to determining the second sharing operation, starting or resuming sharing with the first receiving terminal.

When the first receiving terminal cannot receive the sharing information, the sharing information can be processed through the second receiving terminal and then sent to the first receiving terminal. Therefore, when the sending terminal shares information with multiple receiving terminals, the workload of data sending, receiving and processing in the sending terminal can be reduced. After being processed by the second receiving terminal, the sharing information can be directly sent to the first receiving terminal, or can be processed according to the situation of the first receiving terminal. The processing includes at least one of delaying the sharing with the first receiving terminal, starting or resuming sharing with the first receiving terminal until the first receiving terminal meets the first preset condition, outputting prompt information, or starting or resuming sharing with the first receiving terminal in response to determining the second sharing operation. In this way, the transmit-receiving ability of the first receiving terminal and the second receiving terminal can be considered on the basis that the sharing requirements of the sending terminal are met.

In an embodiment, the first preset condition includes that the first receiving terminal has preset authority and the second preset condition includes that the second receiving terminal does not have preset authority, the processing the sharing information according to at least one first preset strategy and at least one second preset strategy includes:

when the first receiving terminal does not meet the first preset condition and the second receiving terminal does not meet the second preset condition, the sending terminal sends a sharing request for sharing information to the second receiving terminal; and when the feedback result of the sharing request is that sharing is allowed, the sending terminal sends the sharing request to the first receiving terminal.

In an embodiment, the sharing information can be divided into at least one first sharing information and/or at least one second sharing information.

In an embodiment, the first preset condition and/or the second preset condition include at least one of the following:

the first receiving terminal can receive or process the first sharing information;

the first receiving terminal cannot receive or process the second sharing information;

the second receiving terminal can receive or process the first sharing information; and the second receiving terminal cannot receive or process the second sharing information.

In an embodiment, the processing the sharing information according to at least one first preset strategy or at least one second preset strategy includes at least one of the following:

in response to that both the first receiving terminal and the second receiving terminal are capable of receiving or processing the first sharing information and/or the second sharing information, sending the first sharing information and/or the second sharing information directly;

in response to that the first receiving terminal is capable of receiving or processing the first sharing information, sending the first sharing information to the first receiving terminal;

in response to that the second receiving terminal is capable of receiving or processing the second sharing information, sending the second sharing information to the second receiving terminal;

in response to that the first receiving terminal is not capable of receiving or processing the first sharing information and the second receiving terminal is capable of receiving or processing the first sharing information, converting the first sharing information into a third sharing information that can be received or processed by the first receiving terminal through the first conversion terminal, and sending the third sharing information to the first receiving terminal through the first conversion terminal; and in response to that the second receiving terminal is not capable of receiving or processing the second sharing information and the first receiving terminal is capable of receiving or processing the second sharing information, converting the second sharing information into a fourth sharing information that can be received or processed by the second receiving terminal through the second conversion terminal, and sending the fourth sharing information to the second receiving terminal through the second conversion terminal.

In an embodiment, the first preset condition and/or the second preset condition include at least the following:

the connection between the sending terminal and the first receiving terminal can be disconnected;

the connection between the sending terminal and the second receiving terminal can be disconnected;

sharing between the sending terminal and the first receiving terminal can be paused or resumed or terminated or prohibited; and sharing between the sending terminal and the second receiving terminal can be paused or resumed or terminated or prohibited.

In an embodiment, the sending the sharing information according to at least one first preset strategy or at least one second preset strategy includes at least one of the following:

in response to a first operation of the sending terminal, disconnecting from the first receiving terminal and/or the second receiving terminal;

in response to a second operation of the sending terminal, suspending or resuming or terminating or prohibiting sharing with the first receiving terminal and/or the second receiving terminal;

in response to a first operation of the first receiving terminal, disconnecting from the sending terminal and/or the second receiving terminal;

in response to a second operation of the first receiving terminal, suspending or resuming or terminating or prohibiting sharing with the sending terminal and/or the second receiving terminal;

in response to a first operation of the second receiving terminal, disconnecting from the sending terminal and/or the first receiving terminal; and in response to a second operation of the second receiving terminal, suspending or resuming or terminating or prohibiting sharing with the sending terminal and/or the first receiving terminal.

In an embodiment, after the step S100, the method also includes:

during a process of sending the sharing information to the first receiving terminal and the second receiving terminal, detecting whether the first preset condition that is not met by the first receiving terminal and/or the second preset condition that is not met by the second receiving terminal change; and in response to that the first preset condition that is not met by the first receiving terminal and/or the second preset condition that is not met by the second receiving terminal change, processing the sharing information according to a third preset strategy.

In an embodiment, the first preset condition includes at least one of the following: being in the preset mode or preset scenario; having a preset authority; the state being in a preset state, in an embodiment, the preset state including that the traffic is greater than or equal to the preset traffic, the electric quantity is greater than or equal to the preset electric quantity, and the storage space is greater than or equal to the preset size; and meeting the use conditions with preset functions. In an embodiment, the second preset condition includes at least one of the following: not being in the preset mode or preset scenario; not having a preset authority; the state not being in a preset state, in an embodiment, the preset state including that the traffic is greater than or equal to the preset traffic, the electric quantity is greater than or equal to the preset electric quantity, and the storage space is greater than or equal to the preset size; and not meeting the use conditions with preset functions. When the first preset condition that is not met by the first receiving terminal and/or the second preset condition that is not met by the second receiving terminal change, the processing strategy is adjusted to ensure that the sharing process is performed smoothly. For example, the first receiving terminal has sufficient electric quantity when starting receiving files, but after receiving for a period of time, the electric quantity is insufficient. In this case, the remaining files can be sent to the second receiving terminal, and when the first receiving terminal has sufficient electric quantity, the second receiving terminal can send the remaining files to the first receiving terminal.

The information processing method of the present application is applied to the sending terminal and includes the following steps: in response to that sharing information is sent to at least one first receiving terminal, detecting whether an associated second receiving terminal exists; in response to that the associated second receiving terminal exists, detecting whether the first receiving terminal and/or the second receiving terminal meet the preset conditions; and in response to that the preset conditions are met, processing the sharing information according to the preset strategy. In the present application, based on the conditional determination, collaboration and processing strategies among multi receiving terminals, information can be shared between different devices conveniently and quickly, thereby improving the user experience.

The Second Embodiment

Figure 6:
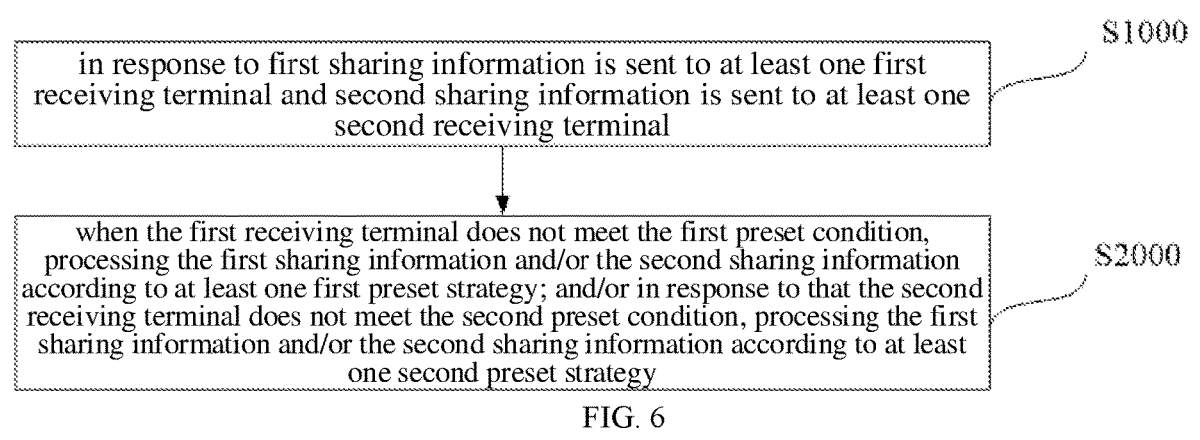

FIG. 6 is a schematic flowchart of the information processing method according to a fourth embodiment. As shown in FIG. 6, the information processing method of the present application is applied to the sending terminal and includes the following steps:

S1000, in response to that first sharing information is sent to at least one first receiving terminal and second sharing information is sent to at least one second receiving terminal; and S2000, when the first receiving terminal does not meet the first preset condition, processing the first sharing information and/or the second sharing information according to at least one first preset strategy; and/or in response to that the second receiving terminal does not meet the second preset condition, processing the first sharing information and/or the second sharing information according to at least one second preset strategy.

The sending terminal, the first receiving terminal, and the second receiving terminal may include terminal devices (such as mobile phones, tablet computers, and the like), wearable smart devices (such as smart watches, smart bracelets, smart headphones, and the like), smart home devices (such as smart TV, smart loudspeaker box, and the like), Internet of Vehicles device (such as smart cars, vehicle-mounted terminals, and the like), through the above method, based on the conditional determination and processing strategies of the receiving terminals, information can be shared between different devices conveniently and quickly, thereby improving the user experience.

In an embodiment, the step S1000 includes at least one of the following:

in response to a preset operation of sending the first sharing information to at least one first receiving terminal and sending the second sharing information to at least one second receiving terminal;

in response to starting sending the first sharing information to at least one first receiving terminal and sending the second sharing information to at least one second receiving terminal; and in response to that sending the first sharing information to at least one first receiving terminal and sending the second sharing information to at least one second receiving terminal are finished.

In an embodiment, the preset operation is used to express sharing intention, including at least one of operations such as selecting sharing information, determining or generating sharing information, selecting the sharing object, determining to start sharing, and the like. In different stages of sending sharing information, that is, in any stage of having the sharing intention, starting sending sharing information and finishing sending sharing information, the sharing information can be processed differently based on the conditional determination and processing strategy of the receiving terminal, to finish the information sharing. For example, in the stage of having the sharing intention, the processing strategy such as prohibiting sharing, sharing after the authority is determined, delaying sharing, and the like can be determined according to the analysis on the type and size of the sharing information, the storage space of the receiving terminal and the sending terminal, the electric quantity, the scenario, the mode and other information. After starting sending the sharing information, the processing strategy such as canceling sharing, pausing sharing, and the like can be determined based on the scenario and mode changes of the receiving terminal and the sending terminal. After finishing sending the sharing information, according to conditions such as the authority of the receiving terminal and whether the information can be withdrawn, the processing strategy such as withdrawing the sharing information, notifying the associated terminal, and the like can be determined. In this way, users can get a more flexible and convenient sharing experience at any stage of sharing information, and moreover, information security during the sharing process can be improved.

In an embodiment, the first preset condition includes at least one of the following: being in the preset mode or preset scenario; having a preset authority; the state being in a preset state, in an embodiment, the preset state including that the traffic is greater than or equal to the preset traffic, the electric quantity is greater than or equal to the preset electric quantity, and the storage space is greater than or equal to the preset size; and meeting the use conditions with preset functions. In an embodiment, the second preset condition includes at least one of the following: not being in the preset mode or preset scenario; not having a preset authority; the state not being in a preset state, in an embodiment, the preset state including that the traffic is greater than or equal to the preset traffic, the electric quantity is greater than or equal to the preset electric quantity, and the storage space is greater than or equal to the preset size; and not meeting the use conditions with preset functions.

In an embodiment, the step S2000 includes at least one of the following:

dividing the first sharing information into at least one third sharing information and at least one fourth sharing information according to the remaining space of the first receiving terminal, the third sharing information or the fourth sharing information being sent to the second receiving terminal;

dividing the second sharing information into at least one fifth sharing information and at least one sixth sharing information according to the remaining space of the second receiving terminal, the fifth sharing information or the sixth sharing information being sent to the first receiving terminal;

dividing the first sharing information into at least one third sharing information and at least one fourth sharing information according to the current states and/or the mode and/or the scenario of the first receiving terminal;

dividing the second sharing information into at least one fifth sharing information and at least one sixth sharing information according to the current states and/or the mode and/or the scenario of the second receiving terminal;

after the second receiving terminal processes the sharing information sent to the first receiving terminal, sending the sharing information to the first receiving terminal;

after the first receiving terminal processes the sharing information sent to the first receiving terminal, sending the sharing information to the second receiving terminal; and the first preset condition including that the first receiving terminal has a preset authority, the second preset condition including that the second receiving terminal does not have a preset authority. When a feedback of the second receiving terminal indicates that sharing is allowed, the first sharing information is sent to the first receiving terminal.

In an embodiment, when sending the first sharing information to the first receiving terminal and sending the second sharing information to the second receiving terminal, the sharing to be sent can be further divided according to the remaining space, current states, modes, and scenarios of the receiving terminal, to make the sharing process more stable, faster and smarter in different sharing stages. For example, the user chooses the file a, file b and file c to send to the first receiving terminal, and chooses the file d, file e and file f to send to the second receiving terminal. However, the current remaining space of the first receiving terminal is not enough to receive the files a, b and c, and the current remaining space of the second receiving terminal is greater than the total size of the files d, e and f In this case, the files a, b and c are divided into two parts according to the remaining space of the first receiving terminal. The files a and b are sent to the first receiving terminal. The files c and d, and files e and f are sent to the second receiving terminal. Then the second receiving terminal will send the file c to the first receiving terminal after the first receiving terminal meets the conditions, for example, the remaining space of the first receiving terminal is enough to receive the file c. Thus, sending files can be finished. In this way, the user can first determine the information to be sent to the receiving terminal according to the actual needs, and then the device can intelligently adjust and send the sharing information according to the situation of the receiving terminal, making the operation simple and convenient.

Figure 7:
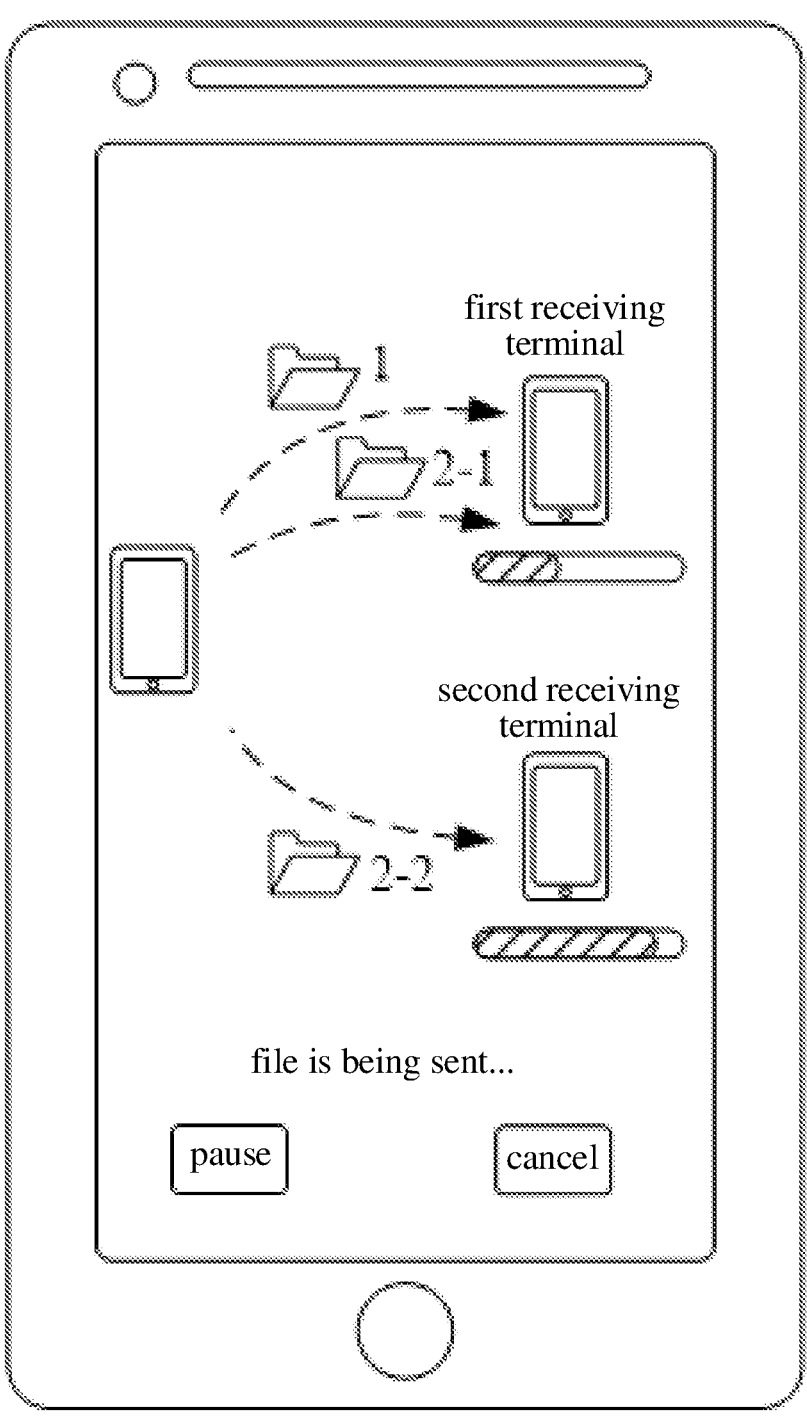
FIG. 7 is a schematic interface diagram of the sending terminal in the information processing method according to the second embodiment.

As shown in FIG. 7, in a sharing scenario, the sending terminal sends the file 1 to the first receiving terminal and sends the file 2 to the second receiving terminal, but the second receiving terminal cannot receive all the information of the file 2. In this case, the file 2 is divided into the file 2-1 and the file 2-2. The file 2-1 is sent to the first receiving terminal, and the file 2-2 is sent to the second receiving terminal. When sending the sharing information, the current sharing process is prompted through the interface, including that the sharing objects are the first receiving terminal and the second receiving terminal, the sharing information is sent to the first receiving terminal and the second receiving terminal respectively, and the current sending progress corresponding to the first receiving terminal and the second receiving terminal, which can be displayed below the corresponding receiving terminal in the form of a progress bar. In addition, the interface provides pause options and cancel options, and users can pause or cancel the sharing process through operations.

The following process for dividing, converting, or receiving the first sharing information and the second sharing information is the same as the process for dividing, converting, or receiving the sharing information in the first embodiment, which will not be repeated here.

In an embodiment, dividing the sharing information includes at least one of the following:

dividing the sharing information after compressing the sharing information;

compressing the sharing information respectively after dividing the sharing information;

dividing the sharing information after copying partial contents of the sharing information;

dividing the sharing information after converting the content and/or format of the sharing information;

dividing the sharing information according to the remaining space of the first receiving terminal and the second receiving terminal;

dividing the sharing information according to the current states and/or the mode and/or the scenario of the first receiving terminal and the second receiving terminal.

In an embodiment, after the step S2000, the method further includes:

during a process of sending the sharing information to the first receiving terminal and the second receiving terminal, detecting whether the first preset condition that is not met by the first receiving terminal and/or the second preset condition that is not met by the second receiving terminal change; and in response to that the first preset condition that is not met by the first receiving terminal and/or the second preset condition that is not met by the second receiving terminal change, processing the sharing information according to a third preset strategy.

In an embodiment, the step S2000 also includes at least one of the following:

in response to that both the first receiving terminal and the second receiving terminal are capable of receiving or processing the first sharing information and/or the second sharing information, sending the first sharing information and/or the second sharing information directly;

in response to that the first receiving terminal is capable of receiving or processing the first sharing information, sending the first sharing information to the first receiving terminal;

in response to that the second receiving terminal is capable of receiving or processing the second sharing information, sending the second sharing information to the second receiving terminal;

in response to that the first receiving terminal is not capable of receiving or processing the first sharing information, converting the first sharing information into a seventh sharing information that can be received or processed by the first receiving terminal through at least one first conversion terminal, and sending the seventh sharing information to the first receiving terminal through the first conversion terminal; and in response to that the second receiving terminal is not capable of receiving or processing the second sharing information, converting the second sharing information into an eighth sharing information that can be received or processed by the second receiving terminal through at least one second conversion terminal, and sending the eighth sharing information to the second receiving terminal through the second conversion terminal.

In an embodiment, the method also includes at least one of the following:

determining the first conversion terminal according to the first sharing information and/or ability of an optional conversion terminal;

determining the second conversion terminal according to the second sharing information and/or ability of an optional conversion terminal;

when the first conversion terminal is the second receiving terminal, after the second receiving terminal finishes receiving the second sharing information, sending the first sharing information to the second receiving terminal for conversion; and when the second conversion terminal is the first receiving terminal, after the first receiving terminal finishes receiving the first sharing information, sending the second sharing information to the first receiving terminal for conversion.

The information processing method of the present application is applied to the sending terminal and includes the following steps: in response to that first sharing information is sent to at least one first receiving terminal and second sharing information is sent to at least one second receiving terminal; and when the first receiving terminal does not meet the first preset condition, processing the first sharing information and/or the second sharing information according to at least one first preset strategy; and/or in response to that the second receiving terminal does not meet the second preset condition, processing the first sharing information and/or the second sharing information according to at least one second preset strategy. Through the above method, based on the conditional determination, collaboration and processing strategies among multi receiving terminals, information can be shared between different devices conveniently and quickly, thereby improving the user experience.

Embodiments of the present application also provide an intelligent terminal. The intelligent terminal includes a memory and a processor. An information processing program is stored in the memory, and when the information processing program is executed by the processor, the information processing method in any of the foregoing embodiments is implemented.

The embodiments of the intelligent terminal provided in the present application contain all the technical features of the above-mentioned embodiments of the information processing method. The expansion and explanation of the description are basically the same as the above embodiments of the information processing method, and will not be repeated here.

The above scenarios are only for examples and do not constitute a limitation on the application scenarios of the technical solutions in the embodiments of the present application, and the technical solutions of the present application may also be applied to other scenarios. For example, those skilled in the art may know that with the evolution of the system architecture and the emergence of new business scenarios, the technical solutions in the embodiments of the present application are equally applicable to similar technical problems.

The above serial numbers of the embodiments of the present application are only for descriptive purposes and do not represent the advantages or disadvantages of the embodiments.

The steps in the method of the embodiments of the present application may be sequentially adjusted, combined and deleted according to actual needs.

The units in the devices of the embodiments of the present application may be combined, divided and deleted according to actual needs.

In the present application, the same or similar terms, technical solutions and/or application scenarios are generally described in detail only at the first occurrence, and when repeated later, they are generally not repeated again for the sake of conciseness. When understanding the technical solutions and other content of the present application, for the same or similar terms, technical solutions and/or application scenario descriptions that are not described in detail later may be referred to the relevant previous detailed descriptions.

In the present application, each embodiment is described with its own emphasis, and the parts that are not described or recorded in a certain embodiment can be referred to the relevant descriptions of other embodiments.

The technical solutions of the present application can be combined randomly. In order to simplify the description, all possible combinations of the technical features in the above embodiments are not described. However, as long as there is no contradiction in the combination of these technical features, it should be considered as within the scope of the present application.

Through the description of the above embodiment, those skilled in the art can clearly understand that the above-mentioned embodiments can be implemented by software plus a necessary general hardware platform, it can also be implemented by hardware, but in many cases the former is a better implementation. Based on this understanding, the technical solution of the present application can be embodied in the form of software product in essence or the part that contributes to the existing technology. The computer software product is stored on a storage medium (such as ROM/RAM, magnetic disk, optical disk) as described above, including several instructions to cause a terminal device (which can be a mobile phone, a computer, a server, a controlled terminal, or a network device, etc.) to execute the method described in each embodiment of the present application.

All or part of the above embodiments may be implemented by software, hardware, firmware, or any combination thereof. When implemented using software, it may be implemented in whole or in part in the form of a computer program product. A computer program product includes one or more computer instructions. When computer program instructions are loaded and executed on a computer, processes or functions according to embodiments of the present application are generated in whole or in part. The computer may be a general purpose computer, a special purpose computer, a computer network, or other programmable device. Computer instructions may be stored in a computer-readable storage medium or transmitted from one computer-readable storage medium to another computer-readable storage medium. For example, the computer instructions may be transmitted from a website, a computer, a server or a data center by wired (for example, coaxial cable, optical fiber, digital subscriber line) or wireless (for example, infrared, wireless, microwave, and the like) means to transmit to another website, computer, server or data center. The computer-readable storage medium can be any available medium that can be accessed by a computer, or a data storage device such as a server, a data center, or other integrated medium that includes one or more available media. Available medium may be the magnetic medium (for example, a floppy disk, a storage disk, a tape), the optical medium (for example, DVD), or the semiconductor medium (for example, Solid State Disk), and the like.

The above are only some embodiments of the present application, and do not limit the scope of the present application thereto. Under the concept of the present application, any equivalent structure or equivalent process transformation made according to the description and drawings of the present application, or direct/indirect application in other related technical fields are included in the scope of the present application.

What is claimed is:

1. An information processing method, applied to a sending terminal, comprising following steps:
S100, in response to that sharing information is sent to at least one first receiving terminal, detecting whether an associated second receiving terminal exists;
S200, in response to that the associated second receiving terminal exists, detecting whether the at least one first receiving terminal and/or the associated second receiving terminal meet preset conditions; and
S300, in response to that the preset conditions are met, processing the sharing information according to a preset strategy;
wherein the step S200 further comprises:
in response to that the associated second receiving terminal exists, dividing the sharing information into at least one first sharing information and/or at least one second sharing information;
the processing the sharing information according to at least one first preset strategy and/or at least one second preset strategy comprises at least one of the following:
in response to that the first receiving terminal is not capable of receiving or processing the first sharing information, converting the first sharing information into a third sharing information that is capable of being received or processed by the first receiving terminal through the first conversion terminal, and sending the third sharing information to the first receiving terminal through the first conversion terminal; and
in response to that the second receiving terminal is not capable of receiving or processing the second sharing information, converting the second sharing information into a fourth sharing information that is capable of being received or processed by the second receiving terminal through the second conversion terminal, and sending the fourth sharing information to the second receiving terminal through the second conversion terminal;
wherein the preset condition comprises that the first receiving terminal does not meet the first preset condition and/or the second receiving terminal does not meet the second preset condition, and the step S300 comprises:
in response to that the first receiving terminal does not meet the first preset condition, processing the sharing information according to at least one first preset strategy; and/or
in response to that the second receiving terminal does not meet the second preset condition, processing the sharing information according to at least one second preset strategy;
wherein after the step S300, the method further comprises:
during a process of sending the sharing information to the first receiving terminal and the second receiving terminal, detecting whether the first preset condition that is not met by the first receiving terminal and/or the second preset condition that is not met by the second receiving terminal change; and
in response to that the first preset condition that is not met by the first receiving terminal and/or the second preset condition that is not met by the second receiving terminal change, processing the sharing information according to a third preset strategy.

2. The method according to claim 1, wherein the step S100 comprises at least one of the following:
in response to a preset operation of sending the sharing information to the at least one first receiving terminal;
in response to that the sharing information starts to be sent to the at least one first receiving terminal; and
in response to that sending the sharing information to the at least one first receiving terminal is finished.

3. The method according to claim 1, wherein the step S100 further comprises at least one of the following:
detecting whether the associated second receiving terminal exists according to terminal association information of the sending terminal and/or the first receiving terminal;
detecting whether the associated second receiving terminal exists according to a content and/or a type of the sharing information; and
detecting whether the associated second receiving terminal exists according to the mode and/or scenario of the sending terminal and/or the first receiving terminal.

4. The method according to claim 1, wherein the processing the sharing information according to at least one first preset strategy, and/or processing the sharing information according to at least one second preset strategy comprises at least one of the following:
pausing sharing with the first receiving terminal and/or the second receiving terminal;
canceling sharing with the first receiving terminal and/or the second receiving terminal;

delaying sharing with the first receiving terminal and/or the second receiving terminal, and/or starting or resuming sharing with the first receiving terminal and/or the second receiving terminal until the first receiving terminal meets the first preset condition and/or the second receiving terminal meets the second preset condition;

outputting prompt information, and/or in response to determining a first sharing operation, starting or resuming sharing with the first receiving terminal and/or the second receiving terminal;

withdrawing information shared to the first receiving terminal and/or the second receiving terminal;

dividing the sharing information into at least one first sharing information and at least one second sharing information according to a remaining space of the first receiving terminal and the second receiving terminal;

dividing the sharing information into at least one first sharing information and at least one second sharing information according to current states, and/or modes, and/or scenarios of the first receiving terminal and the second receiving terminal;

if the sharing information needs to be sent to the first receiving terminal, processing the sharing information through the second receiving terminal; and the first preset condition comprises that the first receiving terminal has a preset authority, the second preset condition comprises that the second receiving terminal does not have a preset authority, and when a feedback of the second receiving terminal indicates that sharing is allowed, the sharing information is sent to the first receiving terminal.

5. The method according to claim 1, wherein the sending the sharing information according to at least one first preset strategy or at least one second preset strategy comprises at least one of the following:

in response to a first operation of the sending terminal, disconnecting from the first receiving terminal and/or the second receiving terminal;

in response to a second operation of the sending terminal, suspending or resuming or terminating or prohibiting sharing with the first receiving terminal and/or the second receiving terminal;

in response to a first operation of the first receiving terminal, disconnecting from the sending terminal and/or the second receiving terminal;

in response to a second operation of the first receiving terminal, suspending or resuming or terminating or prohibiting sharing with the sending terminal and/or the second receiving terminal;

in response to a first operation of the second receiving terminal, disconnecting from the sending terminal and/or the first receiving terminal; and in response to a second operation of the second receiving terminal, suspending or resuming or terminating or prohibiting sharing with the sending terminal and/or the first receiving terminal.

6. An information processing method, applied to a sending terminal, comprising the following steps:

S1000, in response to that first sharing information is sent to at least one first receiving terminal and second sharing information is sent to at least one second receiving terminal, and in response to that the at least one first receiving terminal does not meet a first preset condition, processing the first sharing information and/or the second sharing information according to at least one first preset strategy; and/or in response to that the at least one second receiving terminal does not meet a second preset condition, processing the first sharing information and/or the second sharing information according to at least one second preset strategy;

wherein the step S1000 further comprises at least one of the following:

in response to that the first receiving terminal is not capable of receiving or processing the first sharing information, converting the first sharing information into a seventh sharing information that is capable of being received or processed by the first receiving terminal through at least one first conversion terminal, and sending the seventh sharing information to the first receiving terminal through the first conversion terminal; and in response to that the second receiving terminal is not capable of receiving or processing the second sharing information, converting the second sharing information into an eighth sharing information that is capable of being received or processed by the second receiving terminal through at least one second conversion terminal, and sending the eighth sharing information to the second receiving terminal through the second conversion terminal;

wherein after the step S1000, the method further comprises:

during a process of sending the sharing information to the first receiving terminal and the second receiving terminal, detecting whether the first preset condition that is not met by the first receiving terminal and/or the second preset condition that is not met by the second receiving terminal change; and in response to that the first preset condition that is not met by the first receiving terminal and/or the second preset condition that is not met by the second receiving terminal change, processing the sharing information according to a third preset strategy.

7. The method according to claim 6, wherein the step S1000 comprises at least one of the following:

in response to a preset operation of sending the first sharing information to the at least one first receiving terminal and sending the second sharing information to at least one second receiving terminal;

in response to that the first sharing information starts to be sent to at least one first receiving terminal and the second sharing information starts to be sent to the at least one second receiving terminal; and in response to that sending the first sharing information to the at least one first receiving terminal and sending the second sharing information to the at least one second receiving terminal are finished.

8. The method according to claim 6, wherein the step S1000 further comprises at least one of the following:

dividing the first sharing information into at least one third sharing information and at least one fourth sharing information according to a remaining space of the first receiving terminal, wherein the third sharing information or the fourth sharing information is sent to the second receiving terminal;

dividing the second sharing information into at least one fifth sharing information and at least one sixth sharing information according to a remaining space of the second receiving terminal, wherein the fifth sharing information or the sixth sharing information is sent to the first receiving terminal;

dividing the first sharing information into at least one third sharing information and at least one fourth sharing information according to current states and/or modes and/or scenarios of the first receiving terminal;

dividing the second sharing information into at least one fifth sharing information and at least one sixth sharing information according to current states and/or modes and/or scenarios of the second receiving terminal;

after the second receiving terminal processes the sharing information sent to the first receiving terminal, sending the sharing information to the first receiving terminal;

after the first receiving terminal processes the sharing information sent to the first receiving terminal, sending the sharing information to the second receiving terminal; and the first preset condition comprises that the first receiving terminal has a preset authority, the second preset condition comprises that the second receiving terminal does not have a preset authority, and when a feedback of the second receiving terminal indicates that sharing is allowed, the first sharing information is sent to the first receiving terminal.

9. The method according to claim 6, wherein the dividing the sharing information comprises at least one of the following:

dividing the sharing information after compressing the sharing information;

compressing the sharing information respectively after dividing the sharing information;

dividing the sharing information after copying partial contents of the sharing information;

dividing the sharing information after converting a content and/or a format of the sharing information;

dividing the sharing information according to the remaining space of the first receiving terminal and the second receiving terminal;

dividing the sharing information according to current states and/or modes and/or scenarios of the first receiving terminal and the second receiving terminal.

10. A device, comprising:

a memory; and a processor, wherein an information processing program is stored in the memory, and when the information processing program is executed by the processor, the information processing method according to claim 1 is implemented.

11. A device, comprising:

a memory; and a processor, wherein an information processing program is stored in the memory, and when the information processing program is executed by the processor, the information processing method according to claim 6 is implemented.

* * * * *